(12) United States Patent
Kanada et al.

(10) Patent No.: US 9,713,955 B2
(45) Date of Patent: Jul. 25, 2017

(54) POWER TRANSMITTING APPARATUS FOR HYBRID VEHICLE

(71) Applicant: TOYOTA JIDOSHA KABUSHIKI KAISHA, Toyota-shi, Aichi-ken (JP)

(72) Inventors: Toshiki Kanada, Anjo (JP); Ryuji Ibaraki, Miyoshi (JP); Yuji Yasuda, Miyoshi (JP); Atsushi Tabata, Okazaki (JP); Tatsuya Imamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/915,996

(22) PCT Filed: Sep. 11, 2014

(86) PCT No.: PCT/IB2014/001790
§ 371 (c)(1),
(2) Date: Mar. 2, 2016

(87) PCT Pub. No.: WO2015/036839
PCT Pub. Date: Mar. 19, 2015

(65) Prior Publication Data
US 2016/0193908 A1   Jul. 7, 2016

(30) Foreign Application Priority Data

Sep. 13, 2013   (JP) .................................. 2013-190962

(51) Int. Cl.
| | | |
|---|---|---|
| *F16H 57/04* | (2010.01) | |
| *B60K 6/50* | (2007.10) | |
| *B60K 6/365* | (2007.10) | |
| *B60K 6/387* | (2007.10) | |
| *B60K 6/405* | (2007.10) | |
| *B60K 6/445* | (2007.10) | |
| *F16H 3/72* | (2006.01) | |
| *B60K 6/38* | (2007.10) | |
| *F16H 37/08* | (2006.01) | |

(52) U.S. Cl.
CPC ................ *B60K 6/50* (2013.01); *B60K 6/365* (2013.01); *B60K 6/387* (2013.01); *B60K 6/405* (2013.01);
(Continued)

(58) Field of Classification Search
None
See application file for complete search history.

(56) References Cited

U.S. PATENT DOCUMENTS 4,203,331 A    5/1980   Shindo et al.
7,624,660 B2 *  12/2009   Morise ................ F16H 57/0421
                                                       184/6.12
(Continued)

FOREIGN PATENT DOCUMENTS

JP    S56-53671 B2   12/1981
JP    S58-196364 A   11/1983
(Continued)

*Primary Examiner* — Dirk Wright
(74) *Attorney, Agent, or Firm* — Oliff PLC

(57) ABSTRACT

A power transmitting apparatus (TM) for a hybrid vehicle includes a power split mechanism (4), a transmission gear mechanism (17) and a support (118). The power split mechanism (4) includes a differential device provided with a first/second/third rotation elements. The power split mechanism (4) splits and transmits dynamic power to a drive force source and the drive shaft (126). The transmission gear mechanism (17) changes speed of an engine (1) and transmits a torque to the first rotation element (8), and the elements are arranged in an order of the transmission gear mechanism (17), a rotary machine (2), and the power split mechanism (4) from a side closer to the engine (1). The support (118) is arranged between the transmission gear mechanism (17) and the rotary machine (2), supporting a rotating shaft (2a) of the rotary machine (2), and configured to allow lubricant to enter (118b) the rotary machine side from the transmission gear mechanism side.

4 Claims, 14 Drawing Sheets

(52) U.S. Cl.
CPC ............. *B60K 6/445* (2013.01); *F16H 3/728* (2013.01); *F16H 57/043* (2013.01); *F16H 57/0435* (2013.01); *F16H 57/0476* (2013.01); *B60K 2006/381* (2013.01); *B60Y 2200/92* (2013.01); *B60Y 2300/188* (2013.01); *B60Y 2400/73* (2013.01); *B60Y 2400/80* (2013.01); *F16H 2037/0873* (2013.01); *Y02T 10/6239* (2013.01); *Y10S 903/91* (2013.01); *Y10S 903/915* (2013.01)

(56) References Cited

U.S. PATENT DOCUMENTS

| 7,637,336 | B2 * | 12/2009 | Enomoto | B60K 6/26 |
| | | | | 180/339 |
| 7,942,245 | B2 * | 5/2011 | Shimizu | F16H 57/0421 |
| | | | | 184/6 |
| 2009/0107769 | A1 * | 4/2009 | Sato | B60K 6/365 |
| | | | | 184/6.2 |
| 2010/0133930 | A1 | 6/2010 | Suzuki et al. | |
| 2013/0090202 | A1 | 4/2013 | Hiraiwa | |

FOREIGN PATENT DOCUMENTS

| JP | 2006-298066 A | 11/2006 | | |
| JP | 2008-120234 A | 5/2008 | | |
| JP | 2008-265598 A | 11/2008 | | |
| JP | 2008-265600 A | 11/2008 | | |
| JP | 2008-279916 A | 11/2008 | | |
| JP | 2011-250524 A | 12/2011 | | |
| JP | WO 2012105482 A1 * | 8/2012 | ............. | B60K 6/405 |
| JP | 2013-082317 A | 5/2013 | | |
| JP | 2013-095386 A | 5/2013 | | |
| JP | 2013-112318 A | 6/2013 | | |

* cited by examiner

FIG. 3

| | | | C1 | B1 | MG1 | MG2 |
|---|---|---|---|---|---|---|
| EV | FORWARD/ REVERSE | SINGLE MOTOR DRIVE | | | G | M |
| | | SINGLE MOTOR WITH ENGINE BRAKE | △ | △ | G | M |
| | | DOUBLE MOTOR | ○ | ○ | M | M |
| HV | FORWARD | O/D (HIGH) | | ○ | G | M |
| | | DIRECTLY CONNECTED (LOW) | ○ | | G | M |
| | REVERSE | DIRECTLY CONNECTED (LOW) | ○ | | G | M |

○:ENGAGED   △:ENGAGE WITH EITHER ONE WHEN ENGINE BRAKE IS USED
G:MOSTLY AS GENERATOR   M:MOSTLY AS MOTOR, AND AS GENERATOR DURING REGENERATIVE BRAKING

POWER TRANSMITTING APPARATUS FOR HYBRID VEHICLE

BACKGROUND OF THE INVENTION

1. Field of the Invention

The present invention relates to a power transmitting apparatus mounted in a hybrid vehicle.

2. Description of Related Art

A hybrid vehicle is a vehicle provided with a plurality of drive force sources for traveling that are based on different power generation principles, the drive force sources including an engine that generates dynamic power by converting thermal energy to kinetic energy, a rotary machine with an energy recovery function, and the like. For example, the hybrid vehicle is a vehicle that is provided with an internal combustion engine such as a gasoline engine and a diesel engine, and a rotary machine such as an electric motor, having an electric generation function, and a hydraulic motor, having an accumulator function, as the drive force source. The hybrid vehicle is a vehicle capable of improving energy efficiency and reducing gas emissions by making use of the respective characteristics of the engine and the rotary machine. An example of invention relating to such a hybrid vehicle is disclosed in Japanese Patent Application Publication No. 2008-120234 (JP 2008-120234 A).

A hybrid drive device disclosed in this JP 2008-120234 A is provided with an engine, a first motor that has a function of generating electricity by dynamic power from the engine, and a second motor that outputs dynamic power to an output member using electric power generated by the first motor. The first motor and the second motor are coaxially arranged and a power split mechanism that distributes the dynamic power output by the engine to the first motor side and the output member side is arranged between the first motor and the second motor. The hybrid drive device disclosed in this JP 2008-120234 A has a transmission gear device that changes speeds of an output torque of the engine and transmits to the power split mechanism arranged between the first motor and the second motor.

Japanese Patent Application Publication No. 2008-265598 (JP 2008-265598 A) discloses an invention relating to a hybrid vehicle provided with an engine, a first motor, a second motor, and a power split mechanism that is configured by a planetary gear unit having three rotation elements. The hybrid vehicle according to JP 2008-265598 A is further provided with a clutch that non-rotatably fixes an output shaft of the engine. The first motor is engaged with the output shaft of the engine via the power split mechanism and the second motor is engaged with drive wheels. Respective operations of the engine, the first motor, the second motor, and the clutch are configured so as to be controlled in accordance with a requested drive force of the vehicle. Further, the vehicle is configured such that when the clutch is engaged to fix the output shaft of the engine, motor traveling mode is possible by driving both the first motor and the second motor, in a state where the power split mechanism is made to function as a speed reduction mechanism or a speed increase mechanism.

A similar configuration as that of the hybrid vehicle described in JP 2008-265598 A is also disclosed in Japanese Patent Application Publication No. 2008-265600 (JP 2008-265600 A). JP 2008-265600 discloses a technology in which, if a clutch is engaged and the condition for non-rotatably fixing a crank shaft of the engine is satisfied, an operation of the engine is stopped and at the same time, rotations of the two motors are controlled respectively using a map that specifies a torque split at which the two motors are driven most efficiently on a basis of accelerator operation amount, vehicle speed, and gear ratio of the transmission gear device.

As the abovementioned hybrid drive device disclosed in JP 2008-120234, by adding a transmission gear mechanism for changing the engine speed to the configuration of the power transmitting apparatus for a hybrid vehicle provided with an engine, an electric motor, and a power split mechanism, the engine can be operated at a speed more advantageous in terms of fuel efficiency in accordance with requested drive forces and traveling states of the vehicle. Moreover, energy efficiency of a hybrid vehicle can be improved.

SUMMARY OF THE INVENTION

The transmission gear mechanism as described above is provided with a gear train, friction devices such as a clutch and a brake, and the like. Such gear train and friction devices need to be supplied with lubricant so as to lubricate and cool meshing portions of gears or to lubricate and cool sliding portions of friction materials. Accordingly, oil passages and hydraulic devices for supplying lubricant to the transmission gear mechanism are newly required, in addition to oil passages and hydraulic devices provided in a power transmitting apparatus of a hybrid vehicle for supplying lubricant to a power split mechanism and a coil end or the like of a motor. Therefore, when additionally providing such a transmission gear mechanism, as described above, to the power transmitting apparatus of a hybrid vehicle, configurations of the oil passages and hydraulic devices may become complex, possibly leading to larger devices and increased costs.

The present invention provides a power transmitting apparatus for a hybrid vehicle that has good lubrication and cooling performances without making devices complex or leading to increased costs, even in the case of a configuration including a transmission gear mechanism that changes engine speeds.

A first aspect of the present invention relates to a power transmitting apparatus for a hybrid vehicle including an engine and at least one rotary machine as drive force sources. The power transmitting apparatus includes a power split mechanism, a transmission gear mechanism and a support. The power split mechanism includes a differential device including a first rotation element, a second rotation element engaged with the rotary machine, and a third rotation element engaged with a drive shaft. The power split mechanism splits or combines dynamic power and transmits dynamic power to the drive force source and the drive shaft. The transmission gear mechanism changes rotation speed of the engine and transmits a torque to the first rotation element. The transmission gear mechanism, the rotary machine, and the power split mechanism are arranged in this order from a side closer to the engine. The support is arranged between the transmission gear mechanism and the rotary machine. The support separates the transmission gear mechanism from the rotary machine and supports a rotating shaft of the rotary machine. The support is configured to allow lubricant that has lubricated and cooled the transmission gear mechanism to enter the rotary machine side from the transmission gear mechanism side.

In the power transmitting apparatus, the support may include a rotary machine cover that covers the rotary machine side of the transmission gear mechanism. The rotary machine cover may include a lubrication hole that allows entry of the lubricant into the rotary machine side from the transmission gear mechanism side.

In the power transmitting apparatus, a regulating valve may be provided on the lubrication hole, and configured to change an amount of the lubricant that passes through the lubrication hole depending on a temperature of the lubricant.

In the power transmitting apparatus, the transmission gear mechanism may include a planetary gear unit and friction devices (friction engagement devices) arranged on an outer periphery side of the planetary gear unit, and the lubrication hole may be arranged at a location where the lubricant that has passed through at least one of the planetary gear unit or the friction device enters.

In the power transmitting apparatus, the transmission gear mechanism may be a transmission gear unit accommodated inside a front cover that covers the transmission gear mechanism on a side of the engine, the transmission gear unit covered by the front cover and the rotary machine cover. The transmission gear unit may be attached to an end of a housing on a side of the transmission gear mechanism, the housing accommodating the rotary machine and the power split mechanism.

In the abovementioned power transmitting apparatus for a hybrid vehicle, a transmission gear mechanism for changing the engine speed may include a differential device and friction devices provided between the engine and a group including the rotary machine and the power split mechanism. Between the transmission gear mechanism and the rotary machine, a support that separates the transmission gear mechanism from the rotary machine, while supporting a rotating shaft of the rotary machine is provided. The present invention is configured such that the lubricant that has been supplied to the transmission gear mechanism and lubricated and cooled the transmission gear mechanism is allowed to enter the rotary machine side from the transmission gear mechanism side, via the support. Accordingly, the rotary machine can be lubricated and cooled using the lubricant that has lubricated and cooled the transmission gear mechanism. Therefore, lubricant can be effectively used as the lubricant for the rotary machine without being wastefully emitted.

The configuration that allows entry of lubricant into the rotary machine side from the transmission gear mechanism side as described above, can be realized by providing a penetrating portion (i.e. the lubrication hole) in the support near an outer periphery of the transmission gear mechanism, between the transmission gear mechanism side and the rotary machine side. For example, when forming the support as a partition-shaped cover member, by providing a through hole that allows lubricant flow in the cover member at a location corresponding to an area near an outer periphery of the transmission gear mechanism, a configuration that allows entry of lubricant into the rotary machine side from the transmission gear mechanism side as described above can be realized. That is, lubricant that has been supplied to the transmission gear mechanism and that has lubricated and cooled the transmission gear mechanism moves to an outer periphery side of the transmission gear mechanism due to centrifugal force generated upon rotation of the transmission gear mechanism. Therefore, by providing the configuration that allows entry of lubricant into the rotary machine side from the transmission gear mechanism side, near the outer periphery of the transmission gear mechanism, lubricant that has moved to the outer periphery side of the transmission gear mechanism will enter the rotary machine side from the transmission gear mechanism side.

Therefore, according to the power transmitting apparatus for a hybrid vehicle of the present invention, even in the case of adding the transmission gear mechanism as described above to a conventional power transmitting apparatus for a hybrid vehicle, a configuration capable of lubricating and cooling the rotary machine using lubricant that has lubricated and cooled the transmission gear mechanism can be easily realized without newly adding complex oil passages and hydraulic devices in particular. That is, a power transmitting apparatus for a hybrid vehicle with good lubrication and cooling performances can be provided, even with a configuration obtained by adding a transmission gear mechanism that changes the engine speed to a conventional device, without making the devices complex or leading to increased costs.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a chart collectively showing operation states of a clutch, a brake, and respective motor-generators in respective drive states of the drivetrain shown in FIG. 1 and FIG. 2;

DETAILED DESCRIPTION OF EMBODIMENTS

Next, one embodiment of the present invention will now be described specifically with reference to the attached drawings. A power transmitting apparatus according to this embodiment is to be mounted in a hybrid vehicle. The hybrid vehicle is a vehicle provided with an engine that generates dynamic power by converting thermal energy to kinetic energy, and a rotary machine that recovers energy, as drive force sources. That is, the hybrid vehicle is provided with a plurality of drive force sources based on different power generation principles.

According to the present embodiment, a gasoline engine is used as the engine for the hybrid vehicle. According to the embodiment of the present invention, other internal combustion engines, such as a diesel engine and an LPG engine, fueled by fuels other than gasoline may also be used. In the present embodiment, a motor having an electric generation function is used as the rotary machine (i.e. a motor-generator). Besides, a hydraulic motor having hydraulic and pneumatic accumulator function or a flywheel capable of storing and discharging rotational energy, for example, may be used as the rotary machine according to the embodiment of the present invention.

The hybrid vehicle of the present embodiment is configured such that a traveling mode may be selected from an "engine traveling mode" or an "I-IV (hybrid) traveling mode," in which a vehicle travels on dynamic power output from an engine, and a traveling mode in which a vehicle travels on dynamic power generated by a rotary machine. Particularly, the hybrid vehicle is configured such that when a motor is used as the rotary machine, the traveling mode may be selected between an "engine traveling mode" and a "motor traveling mode," in which the motor is driven by electric power stored in a battery.

Figure 1:
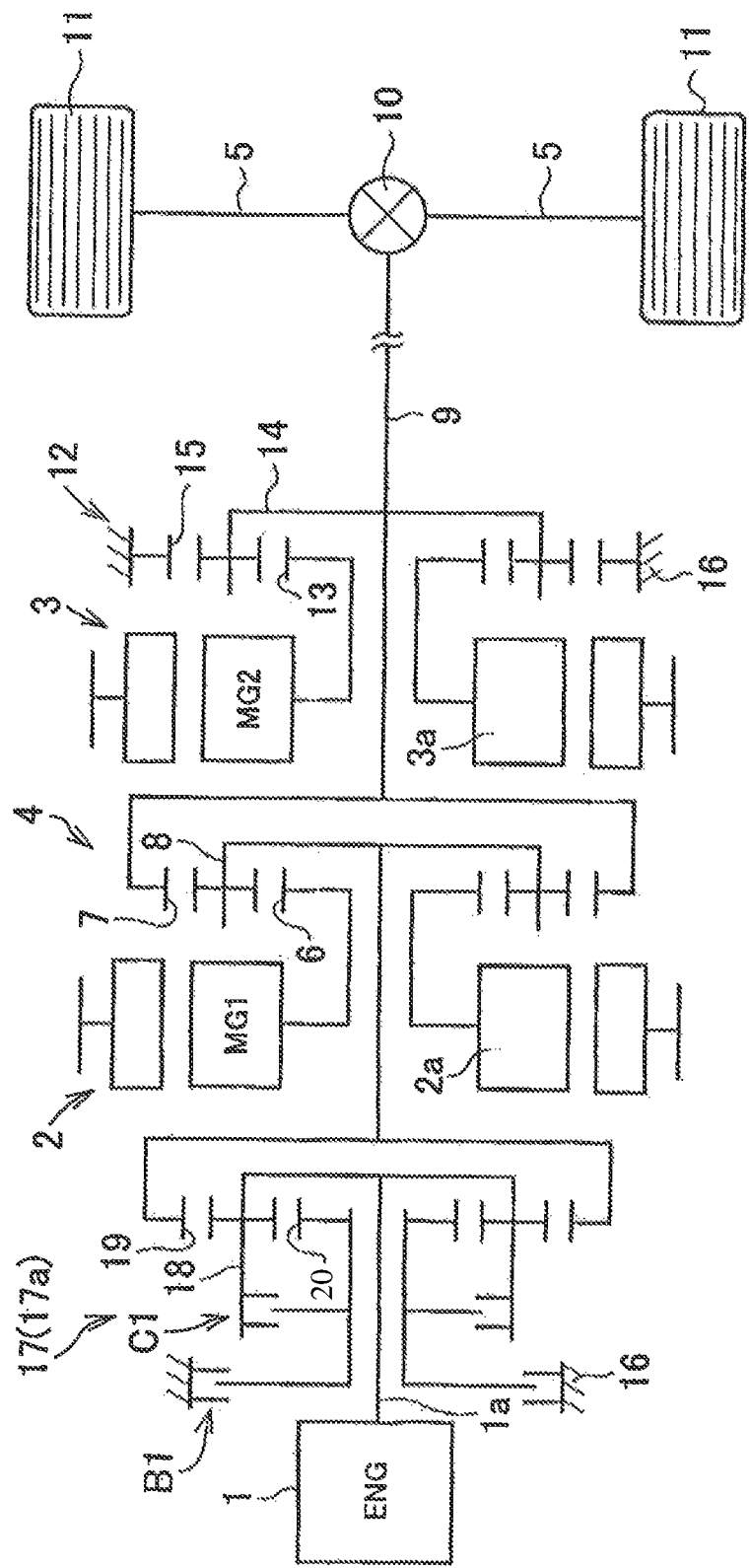
FIG. 1 is a skeleton diagram for illustrating a drivetrain of a hybrid vehicle according to one embodiment of the present invention, showing an example of a drivetrain suitable for use on FR-type vehicles, wherein a transmission gear mechanism is configured by a single-pinion type planetary gear unit.

An example of a powertrain of a hybrid vehicle according to an embodiment of the present invention is illustrated in FIG. 1. The example shown here is a so-called two-motor hybrid vehicle Ve having an engine (ENG) 1 and two rotary machines, a first motor-generator (MG1) 2 and a second motor-generator (MG2) 3 as drive force sources. This hybrid vehicle Ve is configured such that dynamic power output by the engine 1 is split by a power split mechanism 4 to be transmitted to the first motor-generator 2 side and a drive shaft 5 side. The hybrid vehicle Ve is configured such that electric power generated by the first motor-generator 2 is supplied to the second motor-generator (MG2) 3, and that electric power is used to apply dynamic power output by the second motor-generator 3 to the drive shaft 5.

The power split mechanism 4 is configured by a differential device having three rotation elements. Specifically, the power split mechanism 4 is configured by a planetary gear unit having a sun gear as a first rotation element, a carrier as a second rotation element, and a ring gear as a third rotation element. In the example shown in FIG. 1, a single-pinion type planetary gear unit is used as the third rotation element.

The planetary gear unit that configures the power split mechanism 4 described above is coaxially arranged with the engine 1. The first motor-generator 2 is engaged with the sun gear 6 of the planetary gear unit. That is, a rotor 2a of the first motor-generator 2 and the sun gear 6 are engaged. A ring gear 7 is arranged concentrically with the sun gear 6. A pinion gear that is in mesh with the sun gear 6 and the ring gear 7 is supported by a carrier 8 so as to be rotatable and revolvable. An output shaft 1a of the engine 1 is engaged with the carrier 8 via a transmission gear mechanism 17, described later. One end of a propeller shaft 9 is engaged with the ring gear 7. The other end of the propeller shaft 9 is engaged with drive shafts 5 and drive wheels 11 via a differential gear 10.

It is configured such that a torque output by the second motor-generator 3 can be added to a torque transmitted from the power split mechanism 4 to the propeller shaft 9 and the drive wheels 11 described above. Specifically, the second motor-generator 3 is arranged coaxially with the engine 1, and the second motor-generator 3 is engaged with the propeller shaft 9 via a gear train 12.

In the example shown in FIG. 1, a single planetary gear unit is used for the abovementioned gear train 12. A sun gear 13 of the planetary gear unit that constitutes the gear train 12 is engaged with a rotor 3a of the second motor-generator 3. A carrier 14 is engaged with the propeller shaft 9. A ring gear 15 is non-rotatably fixed to a fixing member 16 such as a casing. That is, in this gear train 12, the ring gear 15 is the fixed element. Further, the carrier 14, that serves as an output element when the sun gear 13 is an input element, rotates at a lower rotational speed than the sun gear 13 and in a same direction as the sun gear 13. Accordingly, this gear train 12 functions as a speed reduction mechanism when a torque input to the sun gear 13 is output from the carrier 14. That is, this gear train 12 is configured such that the torque input from the second motor-generator 3 to the sun gear 13 is amplified in the gear train 12 to be transmitted to the propeller shaft 9.

The first motor-generator 2 and the second motor-generator 3 are respectively connected to a battery via controllers such as an inverter, not shown. Both the first motor-generator 2 and the second motor-generator 3 are configured such that electric current is controlled so that the motor-generators function as a motor or a generator. On the other hand, the engine 1 is configured such that a throttle opening angle and an ignition timing thereof can be controlled. The engine 1 is configured such that controls are implemented to automatically stop and to start/restart the combustion operation.

Further, the hybrid vehicle Ve addressed by the present invention is provided with a transmission gear mechanism 17 between the engine 1 and a group including the power split mechanism 4 and the first motor-generator 2. The transmission gear mechanism 17 is configured such that speeds can be switched between direct drive speeds and increased gear speeds (or overdrive (O/D)). In the example shown in FIG. 1, the transmission gear mechanism 17 is configured by a single-pinion type planetary gear unit 17a. A carrier 18 of the planetary gear unit 17a is engaged with the output shaft 1a of the engine 1. A ring gear 19 is engaged with the aforementioned carrier 8 of the power split mechanism 4 so as to rotate together therewith. A clutch C1 that selectively engages the sun gear 20 and the carrier 18 is provided between the sun gear 20 and the carrier 18. A brake B1 that selectively fixes the sun gear 20 in a non-rotatable state is provided in the planetary gear unit 17a. The clutch C1 and the brake B1 may be configured by a friction engagement mechanism that engages by hydraulic pressure, for example.

The abovementioned transmission gear mechanism 17 engages the clutch C1 so as to connect the sun gear 20 and the carrier 18 of the planetary gear unit 17a. As a result, the entire planetary gear unit 17a rotates together, creating a so-called directly connected state where speed increase action and speed reduction action do not take place. Further, by engaging the brake B1 in addition to the clutch C1, the entire transmission gear mechanism 17 is integrally fixed, whereby the rotations of the carrier 8 of the power split mechanism 4 and the engine 1 are stopped. On the other hand, by only engaging the brake B1, the sun gear 20 in the transmission gear mechanism 17 becomes a fixed element, and the carrier 18 becomes the input element. Accordingly, the sun gear 20 that becomes an output element when the carrier 18 is the input element, rotates at a speed higher than the carrier 18 in a same direction as the carrier 18. Accordingly, the transmission gear mechanism 17 functions as a speed increase mechanism, and the overdrive (O/D) speeds, are set by the transmission gear mechanism 17.

The abovementioned hybrid vehicle shown in FIG. 1 is an example of a hybrid vehicle that is configured such that the drive torque output from the drive force source is transmitted to the drive shafts 5 and the drive wheels 11 via the propeller shaft 9. That is, the configuration of the hybrid vehicle Ve shows an example of a drivetrain suitable for use on so-called front engine, rear wheel drive (FR) type vehicles wherein the drive force source is arranged toward a front of a vehicle and a drive force is generated at the rear wheels. However, one embodiment of the present invention is also applicable to so-called front engine, front wheel drive (FF) type hybrid vehicles Ve wherein the drive force source is arranged toward a front of a vehicle and a drive force is generated at the front wheels. An example of a drivetrain suitable for use on such FF-type vehicles is shown in FIG. 2.

Figure 2:
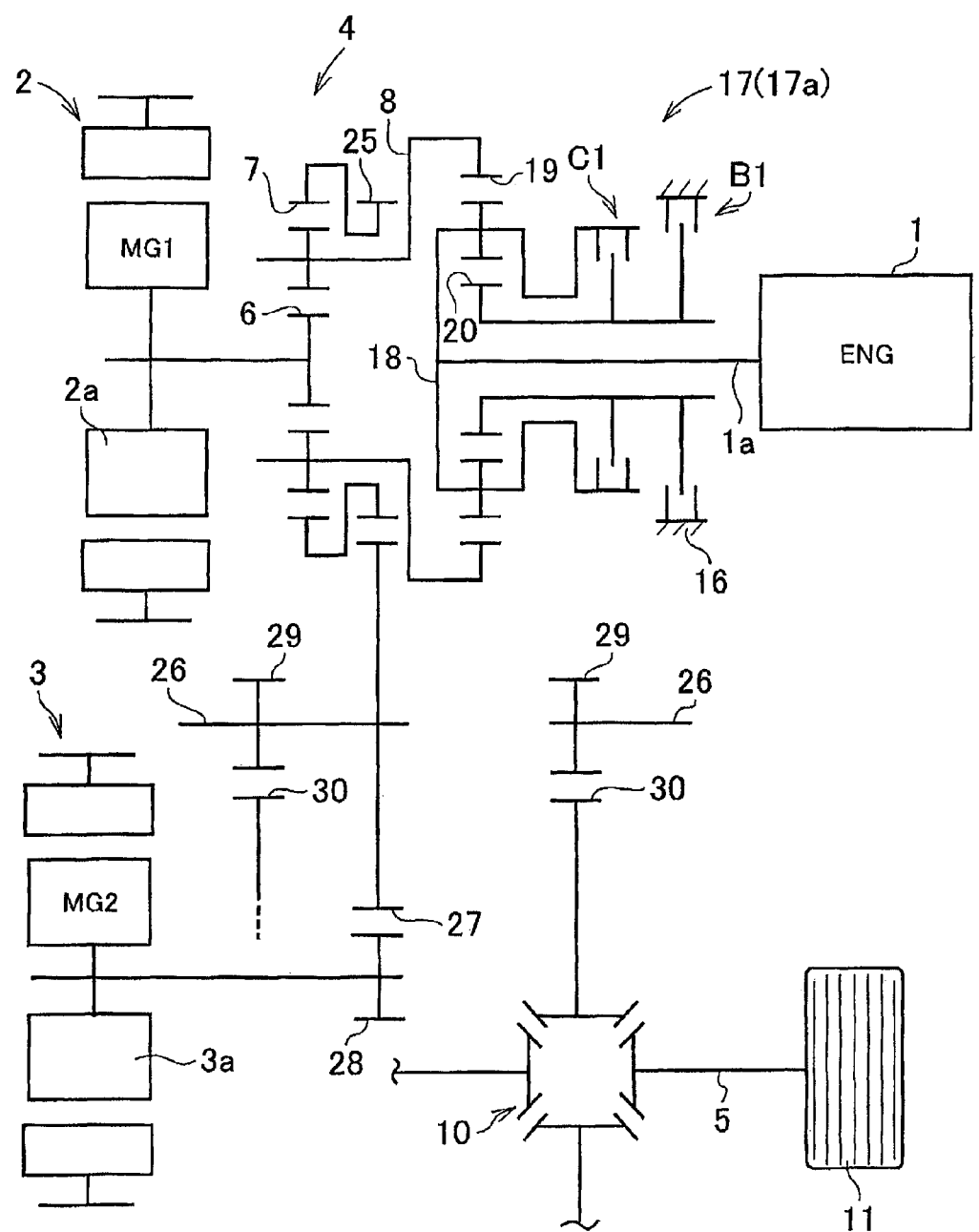
FIG. 2 is a skeleton diagram for illustrating a drivetrain of a hybrid vehicle according to one embodiment of the present invention, showing an example of a drivetrain suitable for use on FF-type vehicles, wherein a transmission gear mechanism is configured by a single-pinion type planetary gear unit.

The hybrid vehicle Ve shown in FIG. 2 has the engine 1, the first motor-generator 2 and the second motor-generator 3 as the drive force sources, as in the case with the abovementioned example shown in FIG. 1. Further, the hybrid vehicle Ve is provided with the transmission gear mechanism 17, the power split mechanism 4, and the gear train 12. The transmission gear mechanism 17 is configured by including the single-pinion type planetary gear unit 17a, the clutch C1, and the brake B1, as in the case with the example shown in FIG. 1. The output shaft 1a of the engine 1 is engaged with the carrier 18 of the planetary gear unit 17a. The carrier 8 of the power split mechanism 4 is engaged with the ring gear 19. In the example shown in FIG. 2, a drive gear 25 is engaged with the ring gear 7 of the power split mechanism 4. The gear train 12 is configured by including the abovementioned drive gear 25, a countershaft 26, a counter driven gear 27, a reduction gear 28, and a differential drive gear 29.

Specifically, in the gear train 12, the countershaft 26 is arranged parallel to the axis of rotation of the engine 1, the power split mechanism 4, and the like. The counter driven gear 27 in mesh with the abovementioned drive gear 25 is installed to the countershaft 26 so as to rotate together therewith. The gear train 12 is configured such that the torque output by the second motor-generator 3 can be added to the torque transmitted from the abovementioned power split mechanism 4 to the drive shaft 5. That is, the second motor generator 3 is arranged parallel to the abovementioned countershaft 26, and the reduction gear 28 engaged with a rotor 3a of the second motor-generator 3 is engaged with the counter driven gear 27. The reduction gear 28 is configured by a gear having a smaller diameter than the counter driven gear 27. Accordingly, the gear train 12 functions as a speed reduction mechanism when the torque input to the reduction gear 28 is transmitted to the countershaft 26 via the counter driven gear 27. That is, the gear train 12 is configured such that the torque output from the second motor-generator 3 is amplified in the gear train 12 to be transmitted to the countershaft 26.

The differential drive gear 29 is installed on the abovementioned countershaft 26 such that it rotates together therewith. In the example shown in FIG. 2, a ring gear 30 is formed on an outer periphery of the differential gear 10. Further, the abovementioned differential drive gear 29 is in mesh with the ring gear 30 formed on the differential gear 10. Accordingly, the configuration is such that the torque input to the power split mechanism 4 and output from the ring gear 7 and the torque output from the second motor-generator 3 are transmitted to the drive shafts 5 and the drive wheels 11 via the gear train 12 and the differential gear 10. In FIG. 2, a position of the differential gear 10 is shifted to the right side of FIG. 2 due to convenience of drawing.

Figure 4:
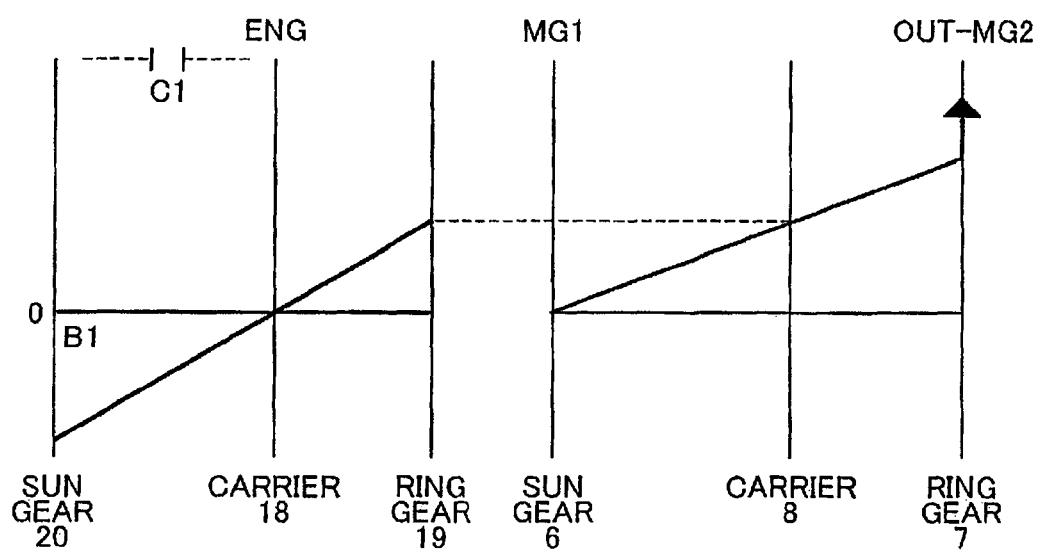
FIG. 4 is a collinear diagram of the power split mechanism and the transmission gear mechanism of the drivetrain shown in FIG. 1 and FIG. 2 in a state where the vehicle is traveling on output from a second motor-generator alone.

Engagement/disengagement states of the clutch C1 and the brake B1 and those in reverse in the respective traveling modes of the abovementioned hybrid vehicle Ve, and operation states of the first motor-generator 2 and the second motor-generator 3, as shown in FIG. 1 and FIG. 2, are summarized in a chart shown in FIG. 3. Briefly explaining each operation state, "EV" in FIG. 3 refers to a motor traveling mode. In the "single motor traveling mode," both the clutch C1 and the brake B1 are disengaged. In the "single motor traveling mode," the second motor-generator 3 is operated as a motor (M) and the first motor-generator 2 functions as a generator (G). In this case, the first motor-generator 2 may be run idle. This state is illustrated in FIG. 4 by a collinear diagram. When generating an engine brake effect in the "single motor traveling mode," one of either the clutch C1 or the brake B1 is engaged to control the rotational speed of the ring gear 7 in the power split mechanism 4.

Figure 5:
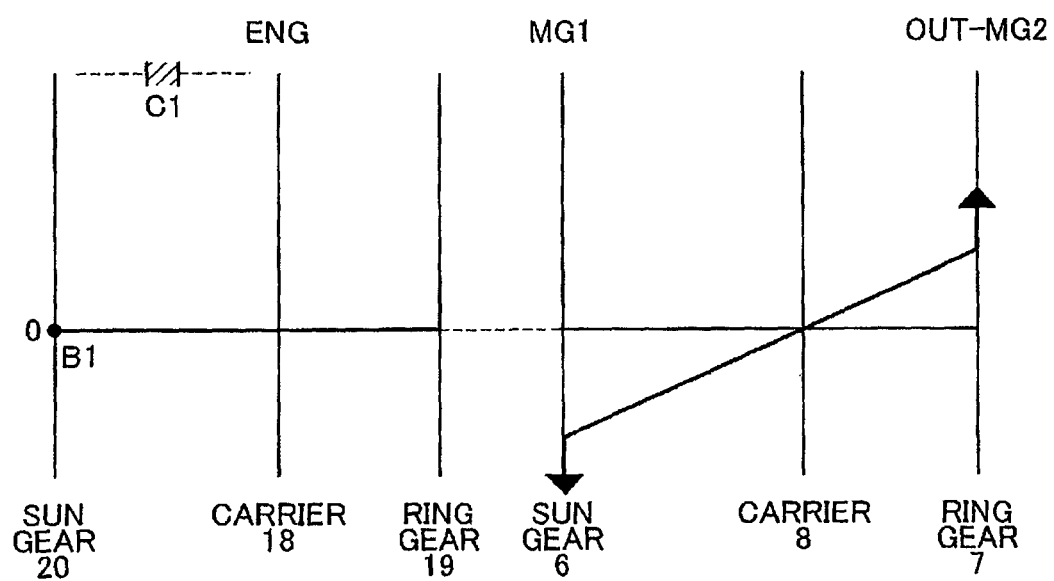
FIG. 5 is a collinear diagram of the power split mechanism and the transmission gear mechanism of the drivetrain shown in FIG. 1 and FIG. 2 in a state where the vehicle is traveling on output from both a first motor-generator and the second motor-generator.

Out of the motor traveling modes as described above, in a "double motor traveling mode," both the first motor-generator 2 and the second motor-generator 3 are made to function as motors. In the "double motor traveling mode," to transmit the torque output from the first motor-generator 2 to the drive shaft 5, both the clutch C1 and the brake B1 are engaged such that the carrier 8 of the power split mechanism 4 is fixed in a non-rotatable state. In that state, transmission gear ratios of the respective rotating elements are set such that the power split mechanism 4 functions as the speed reduction mechanism. Accordingly, in this case, the torque output from the first motor-generator 2 is amplified to be transmitted from the ring gear 7 of the power split mechanism 4 to the propeller shaft 9. This state is illustrated in FIG. 5 as a collinear diagram.

Figure 6:
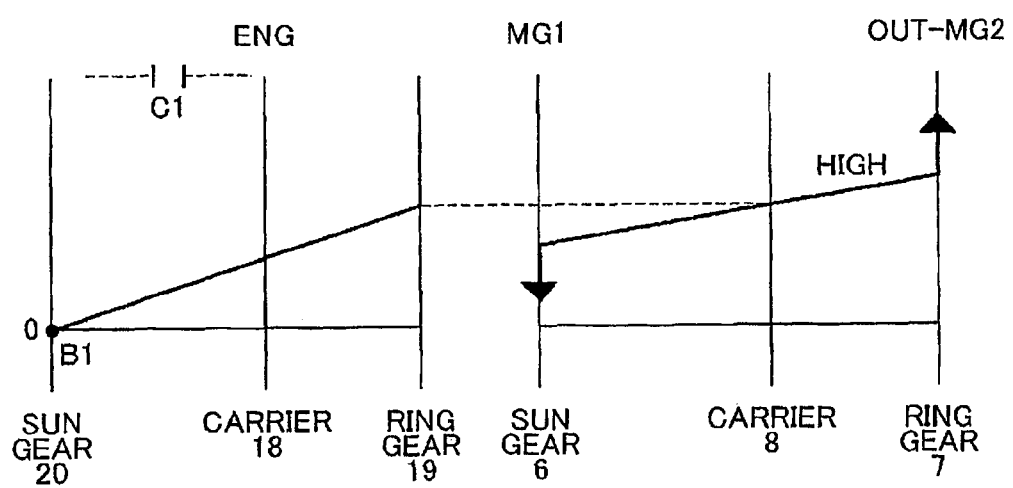
FIG. 6 is a collinear diagram of the power split mechanism and the transmission gear mechanism of the drivetrain shown in FIG. 1 and FIG. 2 in a state where the vehicle is traveling on output from an engine, the transmission gear mechanism set to O/D (High)
Figure 7:
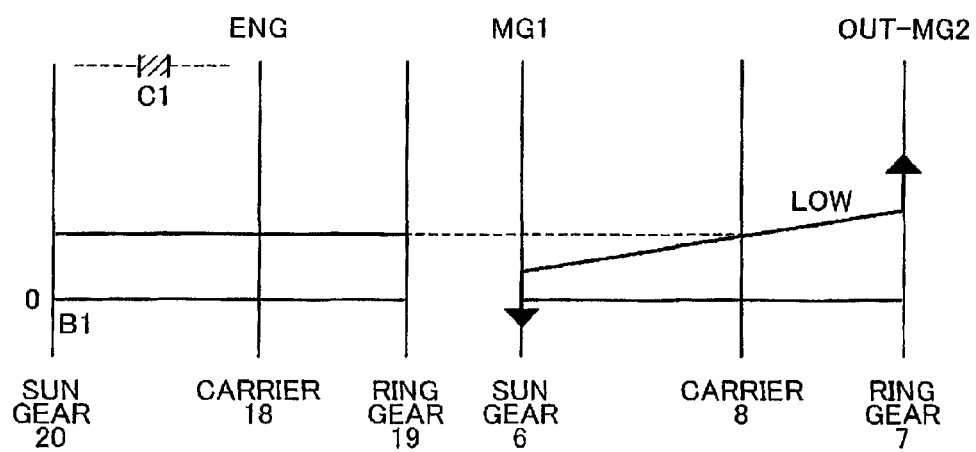
FIG. 7 is a collinear diagram of the power split mechanism and the transmission gear mechanism of the drivetrain shown in FIG. 1 and FIG. 2 in a state where the vehicle is traveling on output from an engine, the transmission gear mechanism set to direct drive speed (Low)

On the other hand, "HV" in the chart shown in FIG. 3 refers to a hybrid drive state wherein the engine 1 is being driven. In a state where the vehicle Ve is traveling under a light load and at medium and high speeds, the transmission gear mechanism 17 is set to O/D state (High). That is, in this state, the clutch C1 is disengaged and the brake B1 is engaged. This state is shown in FIG. 6 as a collinear diagram. In this state, as described above, the first motor-generator 2 controls the engine speed at a favorable speed in terms of fuel efficiency. In that case, electric power generated by the first motor-generator 2 as a result of being made to function as a generator is supplied to the second motor-generator 3. As a result, the second motor-generator 3 is operated as a motor, and outputs a drive torque. Also, in the case where a large drive force is required such as when an accelerator operation amount becomes large at low speeds, the transmission gear mechanism 17 is controlled to be in a directly connected state (Low). That is, the clutch C1 is engaged and the brake B1 is disengaged. As a result, the entire transmission gear mechanism 17 rotates together. This state is shown in FIG. 7 as a collinear diagram. In this case, too, similar to the case of the abovementioned O/D state (High), the first motor-generator 2 is operated as a generator, and the second motor-generator 3 is operated as the motor.

Figure 8:
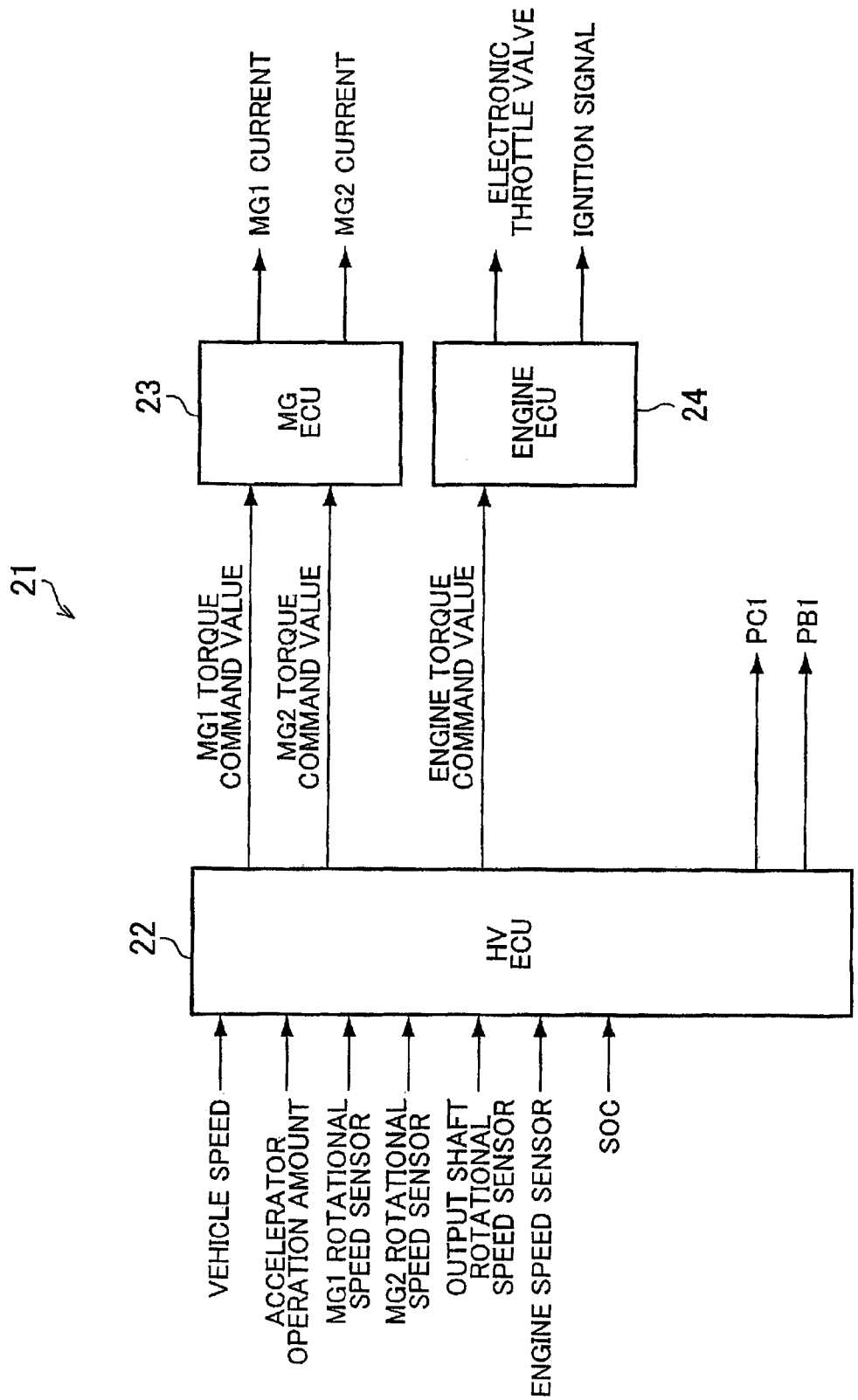
FIG. 8 is a block diagram showing a control system of a hybrid vehicle according to one embodiment of the present invention.

An electronic control unit (ECU) 21 that performs an operation control of the engine 1, an operation control of the first motor-generator 2 and the second motor-generator 3, an engagement/disengagement control of the clutch C1 and the brake B1, and the like, as described above, is provided. A control system of the ECU 21 is shown in a block diagram in FIG. 8.

The ECU 21 includes a hybrid control unit (HV-ECU) 22 that performs a comprehensive control for running, a motor-generator control unit (MG-ECU) 23 that controls the first motor-generator 2 and the second motor-generator 3, an engine control unit (E/G-ECU) 24 that controls the engine 1, and the like. The respective ECUs 22, 23, 24 are microcomputer-based, and are configured to execute operations using input data and pre-stored data, and to output operation results as control command signals.

Data input to the ECU 21 include, for example, a vehicle speed, an accelerator operation amount, a rotational speed of the first motor-generator 2, a rotational speed of the second motor-generator 3, a rotational speed of the ring gear 7 (a rotational speed of output shaft), a speed of engine 1, a battery SOC, and the like which are input to the HV-ECU 22. Command signals output from the ECU 21 include, for example, a torque command value of the first motor-generator 2, a torque command value of the second motor-generator 3, a torque command value of the engine 1, a hydraulic command value PC1 of the clutch C1 and a hydraulic command value PB1 of the brake B1, and the like are output from the HV-ECU 22.

The abovementioned torque command value of the first motor-generator 2 and the torque command value of the second motor-generator 3 are input to the MG-ECU 23 as control data. The MG-ECU 23 is configured such that operations are executed based on these torque command values to output electric current command signals for the first motor-generator 2 and the second motor-generator 3. Engine torque command signals are input to the E/G-ECU 24 as control data. The E/G-ECU 24 is configured such that operations are executed based on the engine torque command signals to output throttle operation amount signals for an electronic throttle valve (not shown) and ignition signals that control ignition timing.

As mentioned above, the engine 1, and the first motor-generator 2 and the second motor-generator 3 that make up the drive force source of the hybrid vehicle Ve differ in power performances and drive characteristics. For example, the engine 1 is operable in a wide operation range ranging from a low torque and low speed range to a high torque and high speed range. Energy efficiency of the engine 1 becomes favorable in an operation range with high torque and high speed of a certain level. On the contrary, the first motor-generator 2 has such characteristics that it outputs a large torque at low rotational speeds in order to perform control of the rotation speed of the engine 1 as well as crank angles and the like upon stopping of the engine 1, and to output drive force. The characteristics of the second motor-generator 3 are such that it is operable at a higher rotational speed than the first motor-generator 2 in order to output torque to the drive shafts 5, and the maximum torque thereof is smaller than that of the first motor generator 2.

The abovementioned hybrid vehicle Ve having the engine 1, and the first motor-generator 2 and the second motor-generator 3 as the drive force sources, the plurality of drive force sources are effectively used such that the energy efficiency and the fuel efficiency are controlled to be favorable. That is, as described above, the vehicle Ve is configured such that the "engine traveling mode" in which the output from the engine 1 is used to travel the vehicle, and the "motor traveling mode" in which output from at least one of the first motor-generator 2 and the second motor-generator 3 is used to travel the vehicle, are selectively set depending on the traveling state of the hybrid vehicle Ve.

Figure 9:
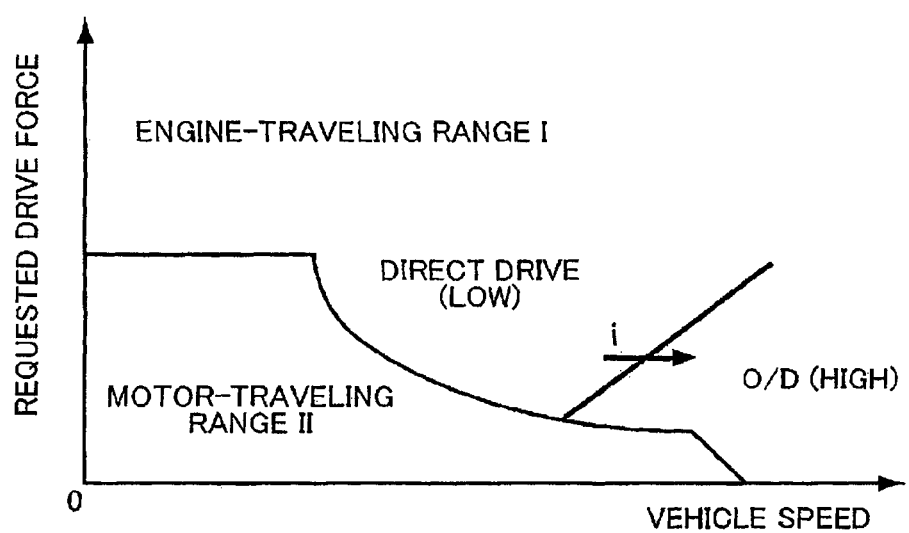
FIG. 9 is a map (diagram) for use with driving control of the hybrid vehicle and speed change control of a transmission gear mechanism according to one embodiment of the present invention, showing an engine-traveling range and a motor-traveling range.

The operation ranges in which the respective traveling modes as described above are set are shown in a map in FIG. 9. FIG. 9 illustrates the operation range of the vehicle Ve, wherein the vehicle speed is taken as the horizontal axis and the requested drive force is taken as the longitudinal axis. The range shown by a symbol I is the engine traveling range wherein the "engine traveling mode" is implemented, and the range shown by a symbol II is the motor traveling range wherein the "motor traveling mode" is implemented. The engine traveling range I is provided with a threshold value T that separates the range to control the transmission gear mechanism 17 in a directly connected state (Low) and the range to control the transmission gear mechanism 17 in an O/D state (High). The respective traveling modes and the respective speeds of the transmission gear mechanism 17 are selectively set in accordance with the requested drive force of the hybrid vehicle Ve. For example, as shown by an arrow i in FIG. 9, an operation point determined by the vehicle speed and the requested drive force shifts from the directly connected state (Low) range to the O/D state (High) range, speed change control is implemented by the transmission gear mechanism 17 to shift from the directly connected state (Low) to the O/D state (High). Switching of the traveling mode and switching of speeds by the transmission gear mechanism 17 due to changes in the operation range are performed by the aforementioned ECU 21.

In the examples of hybrid vehicles Ve shown in the aforementioned FIG. 1 and FIG. 2, the transmission gear mechanism 17 is configured by a single planetary gear unit 17a. However, in this invention, the transmission gear mechanism 17 may be configured by using a double planetary gear unit. An example of a drive train using such a double planetary gear unit as the transmission gear mechanism 17 that is suitable for use on FR-type vehicles is shown in FIG. 10.

Figure 10:
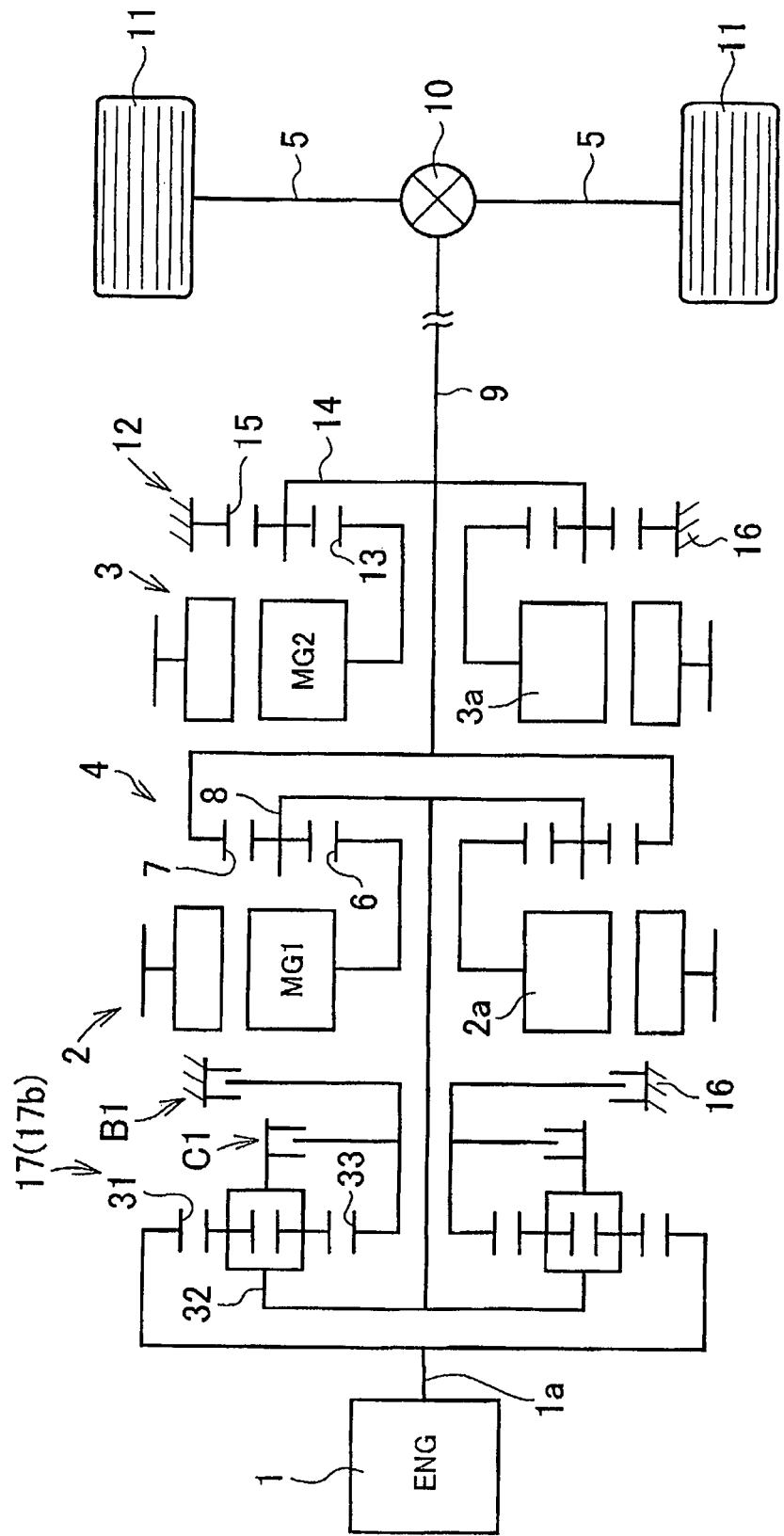
FIG. 10 is a skeleton diagram for illustrating a drivetrain of a hybrid vehicle according to one embodiment of the present invention, showing an example of a drivetrain suitable for use on FR-type vehicles, wherein a transmission gear mechanism is configured by a double-pinion type planetary gear unit.

The hybrid vehicle Ve shown in FIG. 10 differs from the aforementioned hybrid vehicle Ve shown in FIG. 1 only in the configuration of the transmission gear mechanism 17 and coupling relationships between the transmission gear mechanism 17 and the engine 1, and between the transmission gear mechanism 17 and the first motor-generator 2. Specifically, in an example shown in FIG. 10, the transmission gear mechanism 17 is configured by a double-pinion type planetary gear unit 17b. A ring gear 31 of the planetary gear unit 17b is engaged with the output shaft 1a of the engine 1. A carrier 32 is engaged with the carrier 8 of the power split mechanism 4 such that it rotates together therewith. The carrier 32 in an example shown in FIG. 10 is configured such that the two pinion gears, one of which is in mesh with the sun gear 33 and the other is in mesh with the ring gear 31, the pinion gears also in mesh with each other, are supported by the carrier 32 in a manner that allows rotation and revolution of the pinion gears. Further, a clutch C1 that selectively engages the sun gear 33 and the carrier 32 is provided between the sun gear 33 and the carrier 32. Also, the brake B1 that selectively and non-rotatably fixes the sun gear 33 is provided.

In the transmission gear mechanism 17 of the example shown in FIG. 10, the clutch C1 is engaged to connect the sun gear 33 and the carrier 32 of the planetary gear unit 17b, just as in the case of the aforementioned example shown in FIG. 1. As a result, the entire planetary gear unit 17b rotates together, creating a so-called "directly connected state" where no speed increase effect and speed reduction effect are generated. Further, by engaging the brake B1 in addition to the clutch C1, the entire transmission gear mechanism 17 is fixed integrally, and the rotations of the engine 1 and the carrier 8 of the power split mechanism 4 are stopped. However, by engaging only the brake B1, in the transmission gear mechanism 17 of the example shown in FIG. 10, the sun gear 33 of the transmission gear mechanism 17 functions as the fixed element and the ring gear 31 functions as the input element. Accordingly, the carrier 32 that functions as the output element when the ring gear 31 functions as the input element, rotates in a same direction as the ring gear 31 at a higher rotational speed than the ring gear 31. As a result, the transmission gear mechanism 17 functions as a speed increase mechanism. That is, the O/D speeds (High) are set by the transmission gear mechanism 17.

Figure 11:
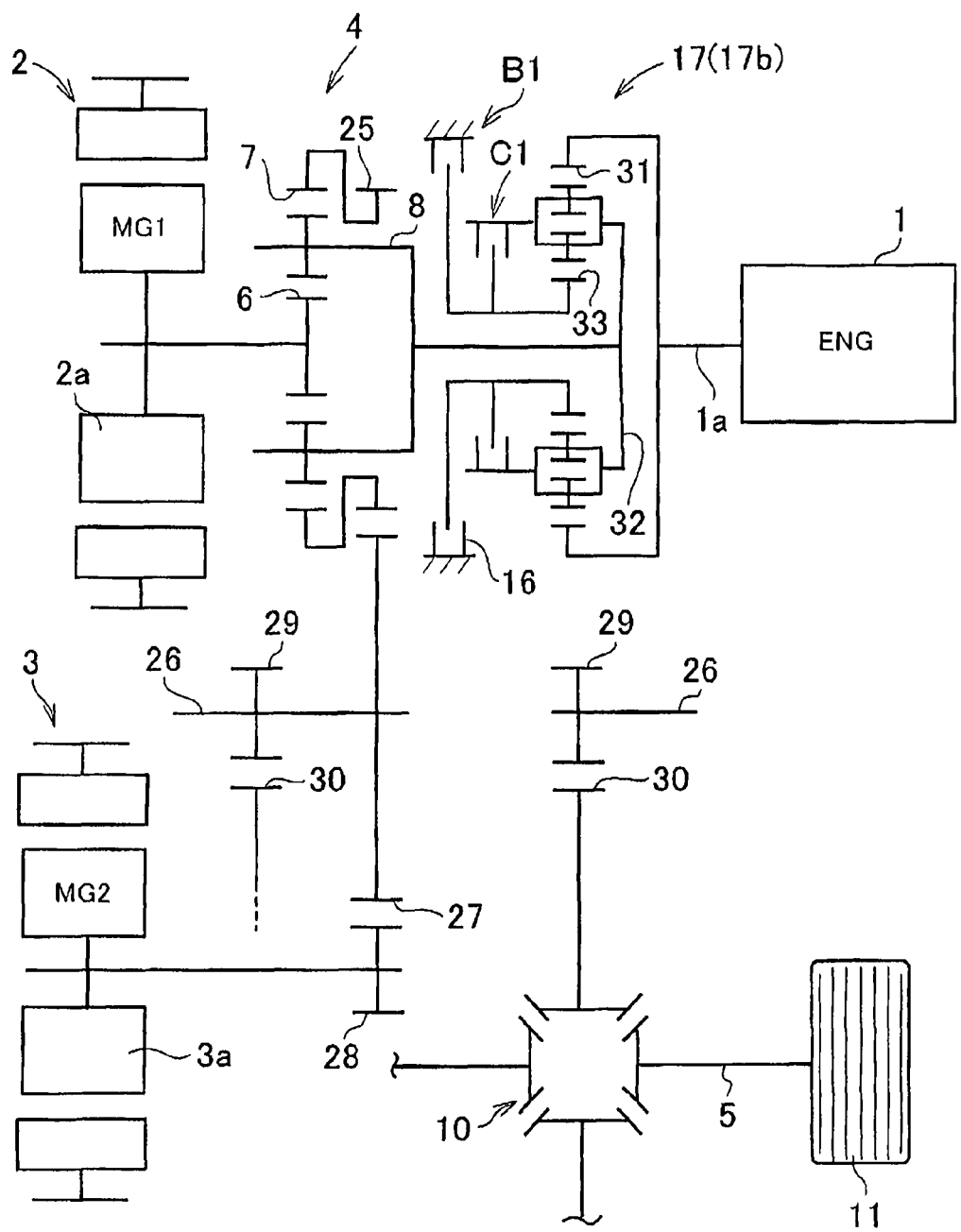
FIG. 11 is a skeleton diagram for illustrating a drivetrain of a hybrid vehicle according to one embodiment of the present invention, showing an example of a drivetrain suitable for use on FF-type vehicles, wherein a transmission gear mechanism is configured by a double-pinion type planetary gear unit.

FIG. 11 shows an example wherein the transmission gear mechanism 17 is configured by a double planetary gear unit, which is a drivetrain suitable for use on FF-type vehicles. The hybrid vehicle Ve shown in FIG. 11 differs from the aforementioned hybrid vehicle Ve shown in FIG. 2 only in the configuration of the transmission gear mechanism 17 and coupling relationships between the transmission gear mechanism 17 and the engine 1 and between the transmission gear mechanism 17 and the first motor-generator 2. The transmission gear mechanism 17 configured by the double-pinion type planetary gear unit 17b, the coupling relationship between the transmission gear mechanism 17 and the engine 1, the coupling relationship between the transmission gear mechanism 17 and the first motor-generator 2, and the like are configured in a similar manner as in the case of the drive train of the abovementioned hybrid vehicle Ve shown in FIG. 10.

As described above, a power transmitting apparatus TM for a hybrid vehicle according to the present invention is provided with the transmission gear mechanism 17 that changes the rotation speed of the engine 1, between the engine 1 and the power split mechanism 4. The transmission gear mechanism 17 sets the speeds to a directly connected state (Low) and an O/D state (High) as described above, and the transmission gear mechanism 17 is provided with the planetary gear unit 17a or the planetary gear unit 17b, and friction device, that is, the clutch C1 and the brake B1 in order to switch the speeds. Accordingly, it is necessary to supply lubricant to the planetary gear unit 17a or the planetary gear unit 17b of the transmission gear mechanism 17, and the clutch C1 and the brake B1 to lubricate and cool the foregoing. That is, oil passages and hydraulic devices need to be provided to supply lubricant to the planetary gear unit 17a or the planetary gear unit 17b, and the clutch C1 and the brake B1.

Figure 12:
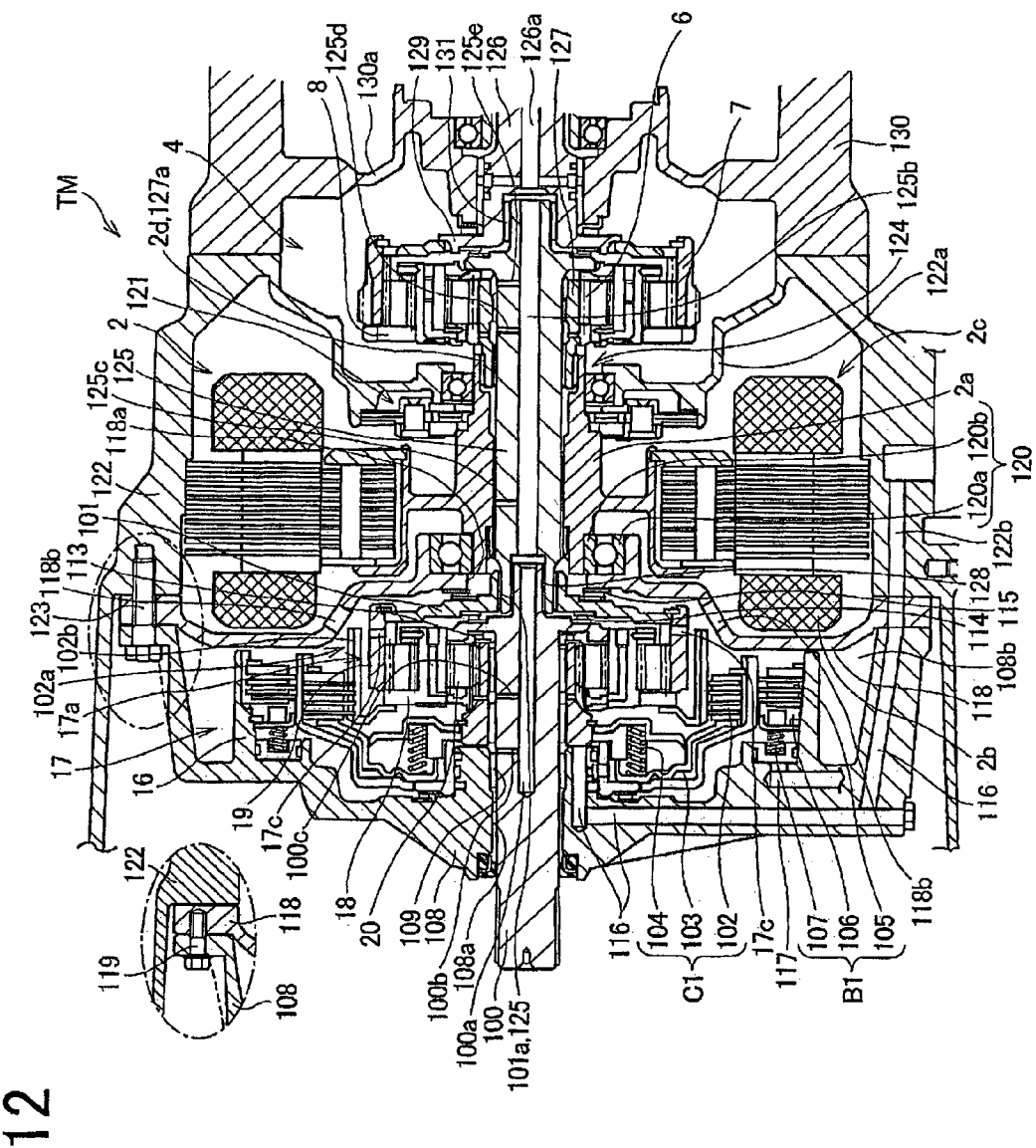
FIG. 12 is a cross sectional view for specifically illustrating a configuration of a power transmitting apparatus for a hybrid vehicle according to one embodiment of the present invention, wherein the transmission gear mechanism is configured by a single-pinion type planetary gear unit.

The power transmitting apparatus for a hybrid vehicle according to the present invention is configured to particularly provide good cooling of a coil end of the first motor-generator 2 without making the configurations of the oil passages and the hydraulic devices complex, even when the transmission gear mechanism 17 as described above is provided. An example of specific configuration is shown in FIG. 12. The power transmitting apparatus TM shown in FIG. 12 has a configuration corresponding to that of the aforementioned drive train shown in FIG. 1 and FIG. 2. That is, it is an example of a case where the transmission gear mechanism 17 is configured by the single-pinion type planetary gear unit 17a.

The power transmitting apparatus TM is provided with the transmission gear mechanism 17, the first motor-generator 2 and the power split mechanism 4. The transmission gear mechanism 17, the first motor-generator 2, and the power split mechanism 4 are arranged in the order of the transmission gear mechanism 17, the first motor-generator 2, and the power split mechanism 4, from a side closer to the engine 1 not shown in FIG. 12, namely, from a front side of the power transmitting apparatus TM (left side in FIG. 12).

The transmission gear mechanism 17 is configured by including the single-pinion type planetary gear unit 17a, the clutch C1 and the brake B1, an input shaft 100, and an output flange 101. The clutch C1 is provided with a friction material 102 for engaging the sun gear 20 and the carrier 18 of the planetary gear unit 17a, and a hydraulic actuator 103 and a return spring 104 for actuating the friction material 102 to control the engagement/disengagement state of the clutch C1. Hydraulic pressure for engaging the clutch C1 is supplied to the hydraulic actuator 103 via an oil passage 116 described later. The brake B1 is provided with a friction material 105 for non-rotatably fixing the sun gear 20 of the planetary gear unit 17a, and a hydraulic actuator 106 and a return spring 107 for actuating the friction material 105 to control the engagement/disengagement state of the brake B1. Hydraulic pressure for engaging the brake B1 is supplied to the hydraulic actuator 106 via an oil passage 117 described later.

A front cover 108 for accommodating the abovementioned planetary gear unit 17a, the clutch C1 and the brake B1, and the input shaft 100 is provided. The front cover 108 is a member that covers a portion of the power transmitting apparatus TM that opposes the engine 1 in a state where assembly of the power transmitting apparatus TM is complete. In the power transmitting apparatus TM shown in FIG. 12, the planetary gear unit 17a, the clutch C1 and the brake B1, the input shaft 100 and the output flange 101 are built into the inside of the front cover 108.

Specifically, the hydraulic actuator 103 and the return spring 104, and the hydraulic actuator 106 and the return spring 107 are installed inside the front cover 108 toward the front side thereof, namely, on a side closer to the engine 1 not shown in FIG. 12, (left side in FIG. 12). The planetary gear unit 17a is arranged behind (right side in FIG. 12) the hydraulic actuators 103, 106 and the return springs 104, 107 on an inner diameter side thereof.

On an inner periphery of the sun gear 20 of the planetary gear unit 17a, the input shaft 100 that functions as an input member of the transmission gear mechanism 17 is arranged such that it is relatively rotate with respect to the sun gear 20. The input shaft 100 is supported by a needle bearing 109 that is provided on an inner periphery of a through hole 108a formed in the front cover 108, and a bush 128 that is provided on an inner periphery of a counterbore hole formed in an input shaft 125 of the power split mechanism 4, described later.

A flange 113 that rotates together with the input shaft 100 is formed on the input shaft 100, and the carrier 18 of the planetary gear unit 17a is engaged with the flange 113 such that it rotates together therewith. That is, the input shaft 100 and the carrier 18 are engaged so as to integrally rotate with each other. Further, a front end (left side in FIG. 12) of the input shaft 100 protrudes from a through hole 108a so as to engage the input shaft 100 with the output shaft 1a of the engine 1 via a damper mechanism (not shown), and the like. A rear end (right side in FIG. 12) of the input shaft 100 is supported by an input shaft 125 of the power split mechanism 4, described later.

On an outer periphery of a rear end of the input shaft 100, and behind the flange 113, the output flange 101 that functions as an output member of the transmission gear mechanism 17 is arranged such that it is relatively rotate with respect to the input shaft 100. The output flange 101 is supported by a thrust bearing 114 provided between the output flange 101 and the flange 113, and a thrust bearing 115 provided between the output flange 101 and the MG1 cover 118, described later.

A ring gear 19 of the planetary gear unit 17a is engaged with the output flange 101 such that it rotates together therewith. On a rear end of the output flange 101, a spline hole 101a for power transmissively coupling the output flange 101 and the input shaft 125 of the power split mechanism 4, described later, is formed. That is, on a front end of the input shaft 125 of the power split mechanism 4, a spline shaft 125a is formed, and the output flange 101 and the input shaft 125 are configured to be spline fit.

On an outer periphery of the abovementioned hydraulic actuator 103 and the return spring 104, and the planetary gear unit 17a, a friction material 102 of the clutch C1 is arranged. A part of the friction material 102 is engaged with the sun gear 20 of the planetary gear unit 17a to integrally rotate therewith. Other part of the friction material 102 is engaged with the carrier 18 of the planetary gear unit 17a to integrally rotate therewith. Further, a friction material 105 of the brake B1 is arranged on an outer periphery of the clutch C1. A part of the friction material 105 is engaged with the sun gear 20 of the planetary gear unit 17a to integrally rotate therewith. Other part of the friction material 105 is fixed to the fixing member 16 formed on the inside of the front cover 108.

An oil passage 116 for supplying engagement hydraulic pressure to the clutch C1 and an oil passage 117 for supplying engagement hydraulic pressure to the brake B1 are formed in the front cover 108. The oil passage 116 is, for example, in the example shown in FIG. 12, is a communicating hole formed by machining three holes inside the front cover 108. Also, similarly, the oil passage 117 is a communicating hole formed by machining three holes inside the front cover 108. The oil passages 116 and the oil passage 117 are configured such that when the MG1 cover 118 and a housing 122, described later, and the front cover 108 are assembled, a supply oil passage 122b formed in the housing 122 are connected, respectively. Hydraulic pressure for controlling the clutch C1 and the brake B1 is supplied to the supply oil passage 122b from a valve body (not shown) side having hydraulic pressure source such as an oil pump.

Oil passages for supplying lubricant to the planetary gear unit 17a, a rotor 2a of the first motor-generator 2, or the power split mechanism 4 are formed inside the respective rotating shafts of the power transmitting apparatus TM. That is, an oil passage 100a for supplying lubricant is formed around the central rotational axis inside the input shaft 100 of the transmission gear mechanism 17. Similarly, an oil passage 125b for supplying lubricant is formed around the central rotational axis inside the input shaft 125 of the power split mechanism 4. An oil passage 126a for supplying lubricant is formed around the central rotational axis inside the output shaft 126 of the power split mechanism 4, described later. Accordingly, the oil passages 100a, 125b, and 126a are all arranged on a same rotational axis, and are in communication with each other to allow circulation of the lubricant. Further, hydraulic pressure for lubrication is supplied sequentially to the respective oil passages 100a, 125b, 126a, from a rear side of the output shaft 126 (that is, from a vehicle rear side relative to the output shaft 126).

The oil passage 100a formed inside the input shaft 100 is in communication with each of an oil passage 100b and an oil passage 100c that are formed so as to penetrate between the oil passage 100a and an outer periphery of the input shaft 100. The oil passage 100b is configured to supply hydraulic pressure for lubrication to sliding portions between the input shaft 100, the front cover 108, and an inner periphery of the sleeve 111. The oil passage 100c is configured to supply hydraulic pressure for lubrication to the planetary gear unit 17a, the clutch C1, and the brake B1 of the transmission gear mechanism 17.

The oil passage 125b formed inside the input shaft 125 is in communication with each of an oil passage 125c, and an oil passage 125d, and an oil passage 125e that are formed so as to penetrate between the oil passage 125b and an outer periphery of the input shaft 125. The oil passage 125c is configured to supply hydraulic pressure for lubrication to sliding portions between the input shaft 125 and an inner periphery of the rotor 2a of the first motor-generator 2, and to portions requiring cooling such as a coil end 2b. The oil passage 125d is configured to supply hydraulic pressure for lubrication to planetary gear unit or the like of the power split mechanism 4. The oil passage 125e is configured to supply hydraulic pressure for lubrication to sliding portions between the input shaft 125 and an inner periphery of a flange 127 of the power split mechanism 4, described later.

In the power transmitting apparatus TM according to one embodiment of the present invention, a lubrication hole 118b for supplying the lubricant that has lubricated and cooled the transmission gear mechanism 17 to the coil end 2b of the first motor-generator 2 is formed in the MG1 cover 118. The MG1 cover 118 separates the transmission gear mechanism 17 from the first motor-generator 2, and at the same time serves as a support for supporting the rotor 2a of the first motor-generator 2.

The lubrication hole 118b is formed in the MG1 cover 118 at a position opposing the coil end 2b as a hole that penetrates between surfaces of the MG1 cover 118 on the transmission gear mechanism 17 side and the first motor-generator 2 side. Further, the lubrication hole 118*b* is formed such that it also opposes a portion near outer periphery of the planetary gear unit 17*a* in a state where the transmission gear mechanism 17 is accommodated inside the front cover 108 and the MG1 cover 118. Accordingly, when the transmission gear mechanism 17 rotates, lubricant supplied to the transmission gear mechanism 17 and the clutch C1 and the brake B1 moves toward an outer periphery of the transmission gear mechanism 17 due to centrifugal force. That is, the lubricant lubricates the transmission gear mechanism 17, the clutch C1 and the brake B1 as it moves toward the outer periphery of the transmission gear mechanism 17. Then, the lubricant that has lubricated the transmission gear mechanism 17, the clutch C1 and the brake B1 is supplied to the coil end 2*b* after passing through the lubrication hole 118.

Further, a through hole 17*c* is formed in the ring gear 19 or in a member forming an outer peripheral surface of the planetary gear unit 17*a*, such as the clutch drum of the planetary gear unit 17*a*. That is, the through hole 17*c* is formed in the member that forms the outer peripheral surface of the planetary gear unit 17*a* as hole that penetrates between the outer peripheral surface and inside the planetary gear unit 17*a*. Accordingly, when the transmission gear mechanism 17 rotates, the lubricant that is supplied to the planetary gear unit 17*a* to lubricate the sun gear 20, the pinion gear, and the like inside the planetary gear unit 17*a* passes through the through hole 17*c* to be discharged outside the planetary gear unit 17*a*. Then, the lubricant discharged outside the planetary gear unit 17*a* passes through the lubrication hole 118*b* to be supplied to the coil end 2*b*.

Further, an extended portion 102*b* is formed on a hub 102*a*, on which a portion of the friction material 102 of the clutch C1 is installed, by extending the hub 102*a* in a direction of the rotational axis toward the MG1 cover 118 side (right side in FIG. 12). The hub 102*a* is formed such that a tip of the extended portion 102*b* on the MG1 cover 118 side opposes an area near an opening of the lubrication hole 118*b*. Accordingly, when the transmission gear mechanism 17 rotates, lubricant that has been subjected to centrifugal force or lubricant that has been stirred and spattered inside the front cover 108 and the MG1 cover 118 adheres to the extended portion 102*b* and flows toward the tip thereof on the MG1 cover 118 side. Then, the lubricant that has left the tip of the extended portion 102*b* and that spattered again passes through the lubrication hole 118*b* to be supplied to the coil end 2*b*.

As described above, in the power transmitting apparatus TM according to the present embodiment, a lubrication hole 118*b* that allows lubricant flow is provided in the MG1 cover 118 at a location corresponding to an area near an outer periphery of the transmission gear mechanism 17. That is, inside the power transmitting apparatus TM is configured such that entry of lubricant into the first motor-generator 2 side from the transmission gear mechanism 17 side is allowed. Lubricant that has been supplied to the transmission gear mechanism 17 and that has lubricated the planetary gear unit 17*a*, and the clutch C1 and the brake B1 moves toward the outer periphery side of the transmission gear mechanism 17 by centrifugal force, and passes through the lubrication hole 118*b* of the MG1 cover 118 to be sprayed on the coil end 2*b* of the first motor-generator 2. Consequently, the lubricant may be effectively used to cool the coil end 2*b*, and as a result, the lubrication performance and cooling performance of the power transmitting apparatus TM can be made favorable.

As described above, oil passages for supplying hydraulic pressure for lubrication are formed inside the respective rotating shafts of the power transmitting apparatus TM. However, the oil passages 116, 117 for supplying hydraulic pressure for speed change control of the transmission gear mechanism 17 are not formed inside the respective rotating shafts of the power transmitting apparatus TM, but instead, are formed inside the front cover 108, as mentioned above. Accordingly, in the power transmitting apparatus TM of the invention, the oil passages formed inside the respective rotating shafts are dedicated to be used for hydraulic pressure for lubrication with relatively lower pressure as compared to the hydraulic pressure for speed change control. As a result, as compared to the case where an oil passage for supplying hydraulic pressure for speed change control is provided inside the rotating shafts, configurations for oil passages inside the respective rotating shafts and the oil passages for supplying lubricant pressure from the oil passages inside the respective rotating shafts to the respective portions of devices are simplified. For example, strengths of seal rings (not shown) provided for preventing oil leakage are reduced. Or, the number of locations using the seal rings is reduced. Also, the number of locations using the seal rings is reduced due to elimination of oil passages in the rotating shafts for speed change control. Accordingly, drag loss that occurs at sliding portions of the seal ring upon rotation of the rotating shaft can be reduced.

Such members as the planetary gear unit 17*a*, the clutch C1, the brake B1, and the input shaft 100 that configure the transmission gear mechanism 17 are assembled in a state accommodated inside the front cover 108. In a state where the respective members configuring the transmission gear mechanism 17 are assembled, the MG1 cover 118 is installed at the opening on a rear side of the front cover 108. For example, as shown in FIG. 12, the front cover 108 and the MG1 cover 118 are integrally fixed by a plurality of bolts 119. A through hole 118*a* similar to that in the front cover 108 is formed in the MG1 cover 118. Further, at the through hole 118*a*, the input shaft 100 of the transmission gear mechanism 17 and the input shaft 125 of the power split mechanism 4, described later, are connected relatively rotate with each other, and the output flange 101 of the transmission gear mechanism 17 and the input shaft 125 of the power split mechanism 4 are configured to be spline fit.

The aforementioned MG1 cover 118 is formed to correspond to a geometry of a front end of the first motor-generator 2 (left side in FIG. 12). Accordingly, while an outer peripheral portion of the MG1 cover 118 is formed to correspond to the position of the end of the coil end 2*b* of the first motor-generator 2 toward the front, the geometry of a central portion of the MG1 cover 118, in which the through hole 118*a* is formed, is such that the MG1 cover 118 slips inside an inner periphery of the coil end 2*b* and a stator 2*c*. That is, as shown in the sectional view in FIG. 12, the central portion of the MG1 cover 118 protrudes toward the right side in FIG. 12, and the through hole 118*a* is located at the inner periphery of the first motor-generator 2. Accordingly, the output flange 101 of the transmission gear mechanism 17 and the input shaft 125 of the power split mechanism 4 are configured to be spline fit at the inner periphery of the first motor-generator 2.

In this way, according to the power transmitting apparatus TM of the present invention, a space at the inner periphery of the first motor-generator 2 is effectively used to arrange the transmission gear mechanism 17 and the power split mechanism 4. Accordingly, by reducing a total length of the power transmitting apparatus TM in the direction of rotational axis, the power transmitting apparatus TM can be made compact and lightweight.

In the example shown in FIG. 12, a space 108b is formed between an outer periphery of the fixing member 16 to which the friction material 105 of the brake B1 is fixed and an inner periphery of the front cover 108. The space 108b effectively functions as an oil pool for oil that has been supplied to the transmission gear mechanism 17 and returned.

On a side of the MG1 cover 118 toward a rear side thereof (right side in FIG. 12) is installed a ball bearing 120 that supports a front end (left side in FIG. 12) of the rotor 2a of the first motor-generator 2. Specifically, an outer race 120a of the ball bearing 120 is fixed to the MG1 cover 118. Further, the configuration is such that by installing the MG1 cover 118 that is fixed integrally with the front cover 108 to a housing 122, described later, in which the first motor-generator 2 is accommodated, the rotor 2a is built into an inner race 120b of the ball bearing 120. Also, a rear end of the rotor 2a (right side in FIG. 12) is supported by a ball bearing 124, described later.

As mentioned above, the respective members configuring the transmission gear mechanism 17, including the planetary gear unit 17a, the clutch C1, the brake B1, and the input shaft 100, and the like, are built into the inside of the front cover 108, which is then covered by the MG1 cover 118 to form a unit in that state. That is, the transmission gear mechanism 17 according to the present embodiment can be formed as a transmission gear unit covered by the front cover 108 and the MG1 cover 118, the transmission gear unit being able to be handled as a subassembly.

Behind the front cover 108 and the MG1 cover 118 that accommodate the transmission gear mechanism 17, the housing 122 that accommodates the first motor-generator 2 and a resolver 121, and the like is arranged. That is, the front cover 108 and the MG1 cover 118 in which the transmission gear mechanism 17 is accommodated and formed as a transmission gear unit, as described above, is fixed toward the front of the housing 122 (left side in FIG. 12). For example, as shown in FIG. 12, the front cover 108 and the MG1 cover 118 are integrally fixed to the housing 122 by a plurality of bolts 123.

The housing 122 is open at a front side, or the MG1 cover 118 side (left side in FIG. 12), and a resolver 121 is installed to inside of a side wall 122a located toward a rear side of the housing 122. A through hole is formed in the side wall 122a, and a ball bearing 124 is installed to an inner periphery of the through hole. Inside the housing 122 in front of the resolver 121, a stator 2c of the first motor-generator 2 is fixed.

The rotor 2a of the first motor-generator 2 is inserted in an inner periphery of the stator 2c. A front end of the rotor 2a (left side in FIG. 12) is configured to be supported on the MG1 cover 118 by the ball bearing 120, as a result of the housing 122 being integrally assembled with the front cover 108 and the MG1 cover 118, as described above. On the other hand, a rear end of the rotor 2a (right side in FIG. 12) is supported on the housing 122 by the aforementioned ball bearing 124. Further, a spline hole 2d for power transmissively coupling the rotor 2a and the sun gear 6 of the power split mechanism 4 is formed on the rear end of the rotor 2a. That is, a spline shaft 127a is formed on the flange 127 that is integrally engaged with the sun gear 6 of the power split mechanism 4 described later, and the rotor 2a and the flange 127 are configured to be spline fit.

The power split mechanism 4 is arranged inside the housing 122 that accommodates the first motor-generator 2. The power split mechanism 4 is configured by a single-pinion type planetary gear unit as described above, and is provided with the input shaft 125 engaged with the carrier 8 such that it rotates together therewith and the output shaft 126 engaged with the ring gear 7 such that it rotates together therewith. The flange 127 is engaged with the sun gear 6 of the power split mechanism 4 such that it rotates together therewith. On an outer periphery of a front end (left side in FIG. 12) of the flange 127, the spline shaft 127a is formed. The flange 127 and the rotor 2a of the first motor-generator 2, on which the aforementioned spline hole 2d is formed, are configured to spline fit with each other. That is, the sun gear 6 of the power split mechanism 4 is engaged by the spline to the rotor 2a of the first motor-generator 2 so as to integrally rotate therewith.

The input shaft 125 is inserted in an inner periphery of the sun gear 6 and the flange 127 such that it is relatively rotate with respect to the sun gear 6 and the flange 127 of the power split mechanism 4. A front portion (left side in FIG. 12) of the input shaft 125 protrudes from the flange 127, and the portion that protrudes from the flange 127 is inserted in an inner periphery of the rotor 2a such that it is relatively rotate with respect to the rotor 2a. Further, the spline shaft 125a is formed at an outer periphery of the front end of the input shaft 125. The input shaft 125 and the output flange 101 of the transmission gear mechanism 17, in which the aforementioned spline hole 101a is formed, are configured to be spline fit. That is, the output flange 101, which is an output member of the transmission gear mechanism 17, and the input shaft 125, which is an input member of the power split mechanism 4, are engaged by the spline so as to integrally rotate with each other. Such coupling of the output flange 101 and the input shaft 125 may employ a serration instead of a spline.

Further, on a front end of the input shaft 125, a counterbore hole that supports a rear end (right side in FIG. 12) of the input shaft 100 of the aforementioned transmission gear mechanism 17 is formed such that the rear end of the input shaft 100 is relatively rotate with respect to the counterbore hole. A bush 128 is provided between the rear end of the input shaft 100 and the counterbore hole formed at the front end of the input shaft 125.

At the front end (left side in FIG. 12) of the output shaft 126, a flange 129 that rotates together with the output shaft 126 is formed, and the ring gear 7 of the power split mechanism 4 is engaged with the flange 129 such that the ring gear 7 rotates together with the flange 129. That is, the output shaft 126 and the ring gear 7 are engaged with rotate together. On the other hand, the rear end (right side in FIG. 12) of the output shaft 126 is engaged with the propeller shaft 9, not shown in FIG. 12, so as to integrally rotate therewith. Further, the rear portion of the output shaft 126 is supported by a case 130 installed at the rear side of the housing 122. That is, a through hole is formed in the side wall 130a on a front side of the case 130, and the rear portion of the output shaft 126 is inserted in the through hole in the side wall 130a. The output shaft 126 is supported on an inner periphery of the through hole in the side wall 130a.

Further, on a front end of the output shaft 126, a counterbore hole that supports a rear end (right side in FIG. 12) of the input shaft 125 of the power split mechanism 4 is formed such that the rear end of the input shaft 125 is relatively rotate with respect to the counterbore hole. A bush 131 is provided between the rear end of the input shaft 125 and the counterbore hole formed at the front end of the output shaft 126.

Further, the example shown above describes a configuration where the ring gear 7 of the power split mechanism 4 is engaged with the propeller shaft 9 via the output shaft 126, that is, the power transmitting apparatus TM of the present invention is applied to the aforementioned drive train suitable for use on FR-type vehicles shown in FIG. 1. On the other hand, in the case where the power transmitting apparatus TM is applied to the aforementioned drive train suitable for use on FF-type vehicles shown in FIG. 2, the configuration will be such that the ring gear 7 of the power split mechanism 4 is engaged, via the output shaft 126, to the drive gear 25 that configures the gear train 12, so as to integrally rotate therewith. Parts other than that can be configured in a similar manner as the aforementioned example shown in FIG. 12.

Figure 13:
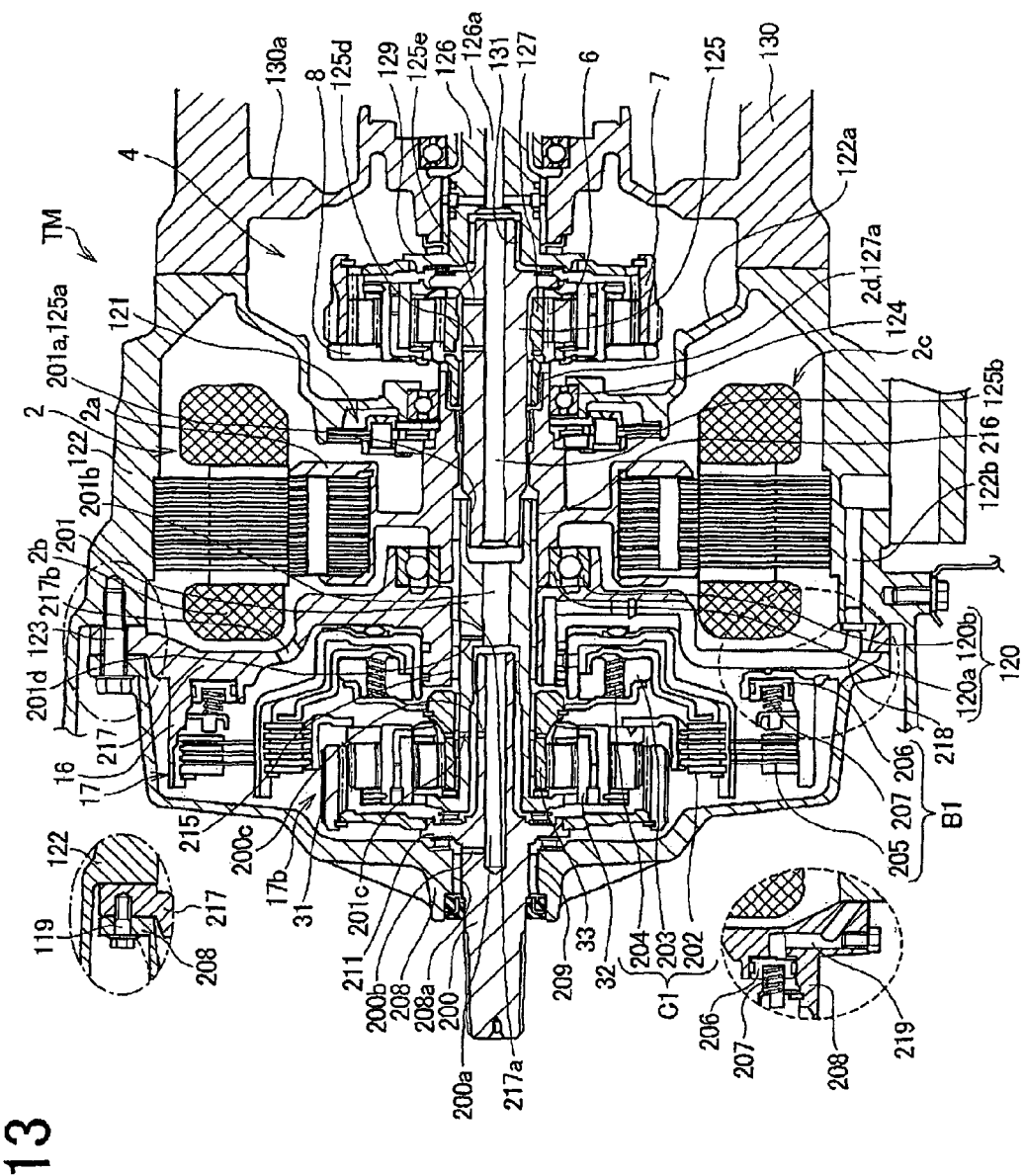
FIG. 13 is a sectional view for specifically illustrating a configuration of a power transmitting apparatus for a hybrid vehicle according to one embodiment of the present invention, wherein the transmission gear mechanism is configured by a double-pinion type planetary gear unit.

FIG. 13 shows other example of configuration of the power transmitting apparatus according to the present embodiment. The power transmitting apparatus TM shown in FIG. 13 corresponds to the aforementioned configurations of the drive train shown in FIG. 10 and FIG. 11. That is, it is an example wherein the transmission gear mechanism 17 is configured by a double-pinion type planetary gear unit 17b.

In FIG. 13, the power transmitting apparatus TM is provided with the transmission gear mechanism 17, the first motor-generator 2, and the power split mechanism 4, similar to the abovementioned configuration shown in FIG. 12. Further, in FIG. 13, the transmission gear mechanism 17, the first motor-generator 2 and the power split mechanism 4 are arranged in this order from a side closer to the engine 1 not shown, that is, from the front of the power transmitting apparatus TM (left side in FIG. 13).

According to the configuration shown in FIG. 13, the transmission gear mechanism 17 is configured by the double-pinion type planetary gear unit 17b, the clutch C1 and the brake B1, the input shaft 200, and an intermediate shaft 201. The clutch C1 is provided with a friction material 202 for coupling the sun gear 33 and carrier 32 of the planetary gear unit 17b, and a hydraulic actuator 203 and a return spring 204 for actuating the friction material 202 to control the engagement/disengagement states of the clutch C1. Hydraulic pressure for engaging the clutch C1 is supplied to the hydraulic actuator 203 via an oil passage 218 described later. On the other hand, the brake B1 is provided with a friction material 205 for non-rotatably fixing the sun gear 33 of the planetary gear unit 17b, and a hydraulic actuator 206 and a return spring 207 for actuating the friction material 205 to control the engagement/disengagement state of the brake B1. Hydraulic pressure for engaging the brake B1 is supplied to the hydraulic actuator 206 via an oil passage 219 described later.

A front cover 208 for accommodating the abovementioned planetary gear unit 17b, the clutch C1 and the brake B1, and the input shaft 200 is provided. The front cover 208 is a member that covers a portion of the power transmitting apparatus TM that opposes the engine 1 in a state where assembly of the power transmitting apparatus TM is complete. In the power transmitting apparatus TM shown in FIG. 13, the planetary gear unit 17b, the clutch C1 and the brake B1, the input shaft 200 and the intermediate shaft 201 are built into the inside of the front cover 208.

Specifically, the planetary gear unit 17b is arranged inside the front cover 208 toward the front side thereof, namely, on a side closer to the engine 1, not shown in FIG. 13, (left side in FIG. 13). On an inner periphery of the sun gear 33 of the planetary gear unit 17b, the input shaft 200 that functions as the input member of the transmission gear mechanism 17 is arranged such that it is relatively rotate with respect to the sun gear 33 and the intermediate shaft 201. The input shaft 200 is supported by a needle bearing 209 that is provided on an inner periphery of a through hole 208a formed in the front cover 208, and bush 210 arranged on an inner periphery of the intermediate shaft 201, as described later. Further, the hydraulic actuator 203 and the return spring 204, the hydraulic actuator 206 and the return spring 207 are installed at a rear side (right side in FIG. 13) of the planetary gear unit 17b.

A flange 211 that rotates together with the input shaft 200 is formed on the input shaft 200, and the ring gear 31 of the planetary gear unit 17b is engaged with the flange 211 such that it rotates together therewith. That is, the input shaft 200 and the ring gear 31 are engaged so as to integrally rotate with each other. Further, a front end (left side in FIG. 12) of the input shaft 200 protrudes from a through hole 208a so as to engage the input shaft 200 with the output shaft 1a of the engine 1 via a damper mechanism (not shown), and the like. A rear end (right side in FIG. 13) of the input shaft 200 is supported by the intermediate shaft 201, as described later. The portion of the input shaft 200 to the rear of the flange 211 has a smaller outside diameter than other portions so as to be insertable into the counterbore hole formed on the intermediate shaft 201.

On an inner periphery of the sun gear 33 of the planetary gear unit 17b, the intermediate shaft 201, that functions as the output member of the transmission gear mechanism 17 in addition to the aforementioned input shaft 200, is arranged such that it is relatively rotate with respect to the input shaft 200 and the sun gear 33. Further, the intermediate shaft 201 is arranged coaxially with the rotational axis of the input shaft 200 behind the input shaft 200. The intermediate shaft 201 is supported by a needle bearing 215 provided on an inner periphery of a through hole 217a formed on an MG1 cover 217, described later, and a needle bearing 216 provided on an inner periphery of the rotor 2a of the first motor-generator 2.

The carrier 32 of the planetary gear unit 17b is engaged with the intermediate shaft 201 so as to rotate together therewith. Further, on the front end of the intermediate shaft 201, a counterbore hole that supports a small diameter portion on a rear side of the input shaft 200 is formed such that the small diameter portion is relatively rotate with respect to the counterbore hole. A bush 210 is provided between the rear end of the input shaft 200 and the counterbore hole formed at the front end of the intermediate shaft 201. On the rear end of the intermediate shaft 201, a spline hole 201a for power transmissively coupling the intermediate shaft 201 and the input shaft 125 of the power split mechanism 4 is formed. That is, on the front end of the input shaft 125 of the power split mechanism 4, a spline shaft 125a is formed, and the intermediate shaft 201 and the input shaft 125 are configured to be spline fit. Accordingly, the intermediate shaft 201, which is an output member of the transmission gear mechanism 17, and the input shaft 125, which is an input member of the power split mechanism 4, are engaged by the spline to integrally rotate with each other. Such coupling of the intermediate shaft 201 and the input shaft 125 may employ a serration instead of a spline.

On an outer periphery of the abovementioned hydraulic actuator 203 and the return spring 204, and the planetary gear unit 17b, a friction material 202 of the clutch C1 is arranged. A part of the friction material 202 is engaged with the sun gear 33 of the planetary gear unit 17b to integrally rotate therewith. Other part of the friction material 202 is engaged with the carrier 32 of the planetary gear unit 17b to integrally rotate therewith. Further, a friction material 205 of the brake B1 is arranged on an outer periphery of the clutch C1. A part of the friction material 205 is fixed to the fixing member 16 formed on the inside of the MG1 cover 217.

Such members as the planetary gear unit 17b, the clutch C1, the brake B1, the input shaft 200, and the intermediate shaft 201 that configure the transmission gear mechanism 17 are assembled in a state where they are accommodated inside the front cover 208. In a state where the respective members configuring the transmission gear mechanism 17 are assembled, the MG1 cover 217 is installed at the opening on a rear side of the front cover 208. For example, as shown in FIG. 13, the front cover 208 and the MG1 cover 217 are integrally fixed by the plurality of bolts 119. A through hole 217a similar to that in the front cover 208 is formed in the MG1 cover 217. At the inner periphery of the through hole 217a, the intermediate shaft 201 is inserted. Further, the rear end of the intermediate shaft 201 in which the spline hole 201a is formed protrudes from the through hole 217a toward the rear side so as to spline fit with the input shaft 125 of the power split mechanism 4 at an inner periphery of the rotor 2a of the first motor-generator 2.

The aforementioned MG1 cover 217 is formed to correspond to a geometry of a front end of the first motor-generator 2 (left side in FIG. 13). Accordingly, while an outer peripheral portion of the MG1 cover 217 is formed to correspond to the position of the end of the coil end 2b of the first motor-generator 2 toward the front, the geometry of a central portion of the MG1 cover 217, in which the through hole 217a is formed, is such that the MG1 cover 217 slips inside an inner periphery of the coil end 2b and the stator 2c. That is, as shown in the sectional view in FIG. 13, the central portion of the MG1 cover 217 protrudes toward the right side in FIG. 13, and the through hole 217a is located at the inner periphery of the first motor-generator 2. Accordingly, the intermediate shaft 201 of the transmission gear mechanism 17 and the input shaft 125 of the power split mechanism 4 are configured to be spline fit at the inner periphery of the first motor-generator 2.

Also in the example shown in FIG. 13, just as in the case with the example shown in FIG. 12, according to the power transmitting apparatus TM of the present invention, a space at the inner periphery of the first motor-generator 2 is effectively used to arrange the transmission gear mechanism 17 and the power split mechanism 4. Accordingly, by reducing a total length of the power transmitting apparatus TM in the direction of rotational axis, the power transmitting apparatus TM can be made compact and lightweight.

In example of the power transmitting apparatus TM for a hybrid vehicle shown in FIG. 13, the oil passage 218 for supplying engagement hydraulic pressure to the clutch C1 and the oil passage 219 for supplying engagement hydraulic pressure to the brake B1 are formed in the MG1 cover 217. The oil passage 218 is formed by fixing, or by retaining, a pipe member formed in a predetermined shape matching the shape of the MG1 cover 217 to an inner (left side in FIG. 13) side surface of the MG1 cover 217. The oil passage 218 can be formed by plastically deforming a metal pipe by a bending process, for example. On the other hand, the oil passage 219 is, for example, a communication hole formed by machining three holes inside the front cover 208. The oil passage 218 and the oil passage 219 are configured such that when the MG1 cover 217 and a housing 122, and the front cover 208 are assembled, a supply oil passage 122b formed in the housing 122 are connected, respectively. Hydraulic pressure for controlling the clutch C1 and the brake B1 is supplied to the supply oil passage 122b from a valve body (not shown) side having hydraulic pressure source such as an oil pump.

In the power transmitting apparatus TM shown in FIG. 13, as well, oil passages for supplying lubricant to the planetary gear unit 17b, a rotor 2a of the first motor-generator 2, or the power split mechanism 4 are formed inside the respective rotating shafts of the power transmitting apparatus TM. That is, an oil passage 200a for supplying lubricant is formed around the central rotational axis inside the input shaft 200 of the transmission gear mechanism 17. Similarly, an oil passage 201b for supplying lubricant is formed around the central rotational axis inside the intermediate shaft 201 of the transmission gear mechanism 17. Similarly, an oil passage 125b for supplying lubricant is formed around the central rotational axis inside the input shaft 125 of the power split mechanism 4. In addition, similarly, an oil passage 126a for supplying lubricant is formed around the central rotational axis inside the output shaft 126 of the power split mechanism 4. Accordingly, the oil passages 200a, 201b, 125b, and 126a are all arranged on a same rotational axis, and are in communication with each other to allow circulation of the lubricant. Further, hydraulic pressure for lubrication is supplied sequentially to the respective oil passages 200a, 201b, 125b, 126a, from a rear side of the output shaft 126.

The oil passage 200a formed inside the input shaft 200 is in communication with each of an oil passage 200b and an oil passage 200c that are formed so as to penetrate between the oil passage 200a and an outer periphery of the input shaft 200. The oil passage 200b is configured to supply hydraulic pressure for lubrication to sliding portions between the input shaft 200 and the front cover 108. The oil passage 200c is configured to supply hydraulic pressure for lubrication to sliding portions between the input shaft 200 and an inner periphery of the intermediate shaft 201 that supports the input shaft 200.

The oil passage 201b formed inside the intermediate shaft 201 is in communication with each of an oil passage 201c and an oil passage 201d that are formed so as to penetrate between the oil passage 201b and an outer periphery of the intermediate shaft 201. The oil passage 201c is configured to supply hydraulic pressure for lubrication to the planetary gear unit 17b of the transmission gear mechanism 17. The oil passage 201d is configured to supply hydraulic pressure for lubrication to sliding portions between the intermediate shaft 201 and an inner periphery of the MG1 cover 217 and the rotor 2a of the first motor-generator 2, and to portions requiring cooling such as the coil end 2b.

The oil passage 125b formed inside the input shaft 125 is in communication with each of an oil passage 125d and an oil passage 125e that are formed so as to penetrate between the oil passage 125b and an outer periphery of the input shaft 125. The oil passage 125d is configured to supply hydraulic pressure for lubrication to planetary gear unit 17b or the like of the power split mechanism 4. The oil passage 125e is configured to supply hydraulic pressure for lubrication to sliding portions between the input shaft 125 and an inner periphery of a flange 127 of the power split mechanism 4.

Further, in the power transmitting apparatus TM shown in FIG. 13, as well, a lubrication hole 217b for supplying the lubricant that has lubricated and cooled the transmission gear mechanism 17 to the coil end 2b of the first motor-generator 2 is formed in the MG1 cover 217. The MG1 cover 217 separates the transmission gear mechanism 17 from the first motor-generator 2, and at the same time serves as a support for supporting the rotor 2a of the first motor-generator 2.

The lubrication hole 217b is formed in the MG1 cover 217 at a location opposing the coil end 2b as a hole that penetrates between surfaces of the MG1 cover 217 on the transmission gear mechanism 17 side and the first motor-generator 2 side. Further, the lubrication hole 217*b* is formed such that it also opposes a portion near outer periphery of the planetary gear unit 17*b* in a state where the transmission gear mechanism 17 is accommodated inside the front cover 208 and the MG1 cover 217. Accordingly, when the transmission gear mechanism 17 rotates, lubricant supplied to the transmission gear mechanism 17 and the clutch C1 and the brake B1 moves toward an outer periphery of the transmission gear mechanism 17 due to centrifugal force. That is, the lubricant lubricates the transmission gear mechanism 17, the clutch C1 and the brake B1 as it moves toward the outer periphery of the transmission gear mechanism 17. Then, the lubricant that has lubricated the transmission gear mechanism 17, the clutch C1 and the brake B1 is supplied to the coil end 2*b* after passing through the lubrication hole 217.

Accordingly, in the power transmitting apparatus TM shown in FIG. 13, as well, a lubrication hole 217*b* that allows lubricant flow is provided in the MG1 cover 217 at a location corresponding to an area near an outer periphery of the transmission gear mechanism 17. That is, inside the power transmitting apparatus TM is configured such that entry of lubricant into the first motor-generator 2 side from the transmission gear mechanism 17 side is allowed. Lubricant that has been supplied to the transmission gear mechanism 17 and that has lubricated the planetary gear unit 17*b*, and the clutch C1 and the brake B1 moves toward the outer periphery side of the transmission gear mechanism 17 by centrifugal force, and passes through the lubrication hole 217*b* of the MG1 cover 217 to be sprayed on the coil end 2*b* of the first motor-generator 2. Consequently, the lubricant may be effectively used to cool the coil end 2*b*, and as a result, the lubrication performance and cooling performance of the power transmitting apparatus TM can be made favorable.

Further, as described above, in the power transmitting apparatus TM shown in FIG. 13, as well, oil passages for supplying hydraulic pressure for lubrication are formed inside the respective rotating shafts of the power transmitting apparatus TM. However, the oil passages 218, 219 for supplying hydraulic pressure for speed change control of the transmission gear mechanism 17 are not formed inside the respective rotating shafts of the power transmitting apparatus TM, but instead, are formed along the MG1 cover 217 or inside the MG1 cover 217, as mentioned above. Accordingly, in the power transmitting apparatus TM of the invention, the oil passages formed inside the respective rotating shafts are dedicated to be used for hydraulic pressure for lubrication with relatively lower pressure as compared to the hydraulic pressure for speed change control. As a result, as compared to the case where an oil passage for supplying hydraulic pressure for speed change control is provided inside the rotating shafts, configurations for oil passages inside the respective rotating shafts and the oil passages for supplying lubricant pressure from the oil passages inside the respective rotating shafts to the respective portions of devices are simplified. For example, strengths of seal rings (not shown) provided for preventing hydraulic pressure leakage are reduced. Or, the number of locations using the seal rings is reduced. Also, the number of locations using the seal rings is reduced due to elimination of oil passages in the rotating shafts for speed change control. Accordingly, drag loss that occurs at sliding portions of the seal ring upon rotation of the rotating shaft can be reduced.

On a side of the MG1 cover 217 toward a rear side thereof (right side in FIG. 13) is installed a ball bearing 120 that supports a front end (left side in FIG. 13) of the rotor 2*a* of the first motor-generator 2. Specifically, an outer race 120*a* of the ball bearing 120 is fixed to the MG1 cover 217. Further, the configurations is such that by installing the MG1 cover 217 that is fixed integrally with the front cover 208 to a housing 122, in which the first motor-generator 2 is accommodated, the rotor 2*a* is built into an inner race 120*b* of the ball bearing 120.

As mentioned above, the respective members configuring the transmission gear mechanism 17, including the planetary gear unit 17*b*, the clutch C1, the brake B1, the input shaft 200, the intermediate shaft 201, and the like are built into the inside of the front cover 208, which is then covered by the MG1 cover 217 to form a unit in that state. That is, the transmission gear mechanism 17 according to the present invention can be formed as a transmission gear unit covered by the front cover 208 and the MG1 cover 217, the transmission gear unit being able to be handled as a subassembly.

Behind the front cover 208 and the MG1 cover 217 that accommodate the transmission gear mechanism 17, the housing 122 that accommodates the first motor-generator 2 and a resolver 121, and the like is arranged. That is, the front cover 208 and the MG1 cover 217 in which the transmission gear mechanism 17 is accommodated and formed as a transmission gear unit, as described above, is fixed toward the front of the housing 122 (left side in FIG. 13). For example, as shown in FIG. 13, the front cover 208 and the MG1 cover 217 are integrally fixed to the housing 122 by the plurality of bolts 123. Configurations to the rear side of the front cover 208 and the MG1 cover 217, that is, the configurations to the rear side of the housing 122 are the same as the aforementioned configurations shown in FIG. 12.

Assembly procedures of the abovementioned power transmitting apparatus TM shown in FIG. 12 or FIG. 13 will now be explained. First, the ball bearing 124 and the resolver 121 are installed inside the housing 122. Next, the stator 2*c* of the first motor-generator 2 is installed. Then, the rotor 2*a* of the first motor-generator 2 is built into an inner periphery of the stator 2*c*.

Separately from the assembly of the resolver 121 and the first motor-generator 2 with respect to the housing 122, the transmission gear unit is assembled. That is, the clutch C1 and the brake B1 are installed inside the front cover 108. Next, the planetary gear unit 17*a*, the input shaft 100, and the output flange 101 are installed. Then, the MG1 cover 118 is installed so as to cover the front cover 108. Or instead, the planetary gear unit 17*b* and the input shaft 200 and the intermediate shaft 201 are installed inside the front cover 208. Next, the clutch C1 and the brake B1 are installed. Then, the MG1 cover 217 is installed so as to cover the front cover 208. Thus, the transmission gear mechanism 17 is assembled as a transmission gear unit in a state covered by the front cover 208 and the MG1 cover 217.

Inside the housing 122 to which the resolver 121, the first motor-generator 2, and the like are built in, the transmission gear unit, that is, the transmission gear mechanism 17 installed inside the front cover 108 and the MG1 cover 118, or inside the front cover 208 and the MG1 cover 217, is installed. That is, on the left side of the housing 122, as shown in FIG. 12 or in FIG. 13, a transmission gear unit having a built-in transmission gear mechanism 17 is installed.

As mentioned above, in the power transmitting apparatus TM of the present invention, by installing the transmission gear unit to the housing 122, oil passages 116, 117, or oil passages 218 and 219 are connected to the supply oil passage 122b formed in the housing 122. Accordingly, by assembling the transmission gear unit having a built-in transmission gear mechanism 17 to the housing 122 as described above, either the oil passages 116, 117 or the oil passages 218, 219 and the supply oil passage 122b of the housing 122 are communicated, and the hydraulic pressure for speed change control supplied from the hydraulic pressure source will be able to be supplied to the either hydraulic actuators 103, 106, or the hydraulic actuators 203, 206 of the transmission gear mechanism 17 via the supply oil passage 122b and either the oil passages 116, 117 or the oil passages 218, 219.

Further, in the state where the transmission gear unit is assembled to the housing 122 as mentioned above, inspection of the first motor-generator 2 can be implemented. Specifically, instead of the flange 127 of the power split mechanism 4 on which the spline shaft 127a is formed, a dummy shaft (not shown) having formed thereon a similar spline shaft 127a is fit into the spline hole 2d formed in the rear end (right side in FIG. 12 and FIG. 13) of the rotor 2a of the first motor-generator 2. Then, by connecting the dummy shaft to a predetermined measurement instrument, and subjecting the first motor-generator 2 to a test operation, operation check of the first motor-generator 2 and adjustments and the like of the resolver 121 can be easily implemented.

Next, the power split mechanism 4 is assembled to the housing 122 to which the transmission gear unit has been assembled. Specifically, the power split mechanism 4 is assembled from the right side (in FIG. 12 or FIG. 13) of the housing 122. In the power split mechanism 4, the input shaft 125, the flange 127, and the output shaft 126, and the like are assembled to the planetary gear unit in advance. The input shaft 125 of the power split mechanism 4 is inserted to an inner periphery of the rotor 2a of the first motor-generator 2 assembled to the housing 122. Then, the spline shaft 125a formed on the input shaft 125 and the spline hole 101a formed in the output flange 101 of the transmission gear mechanism 17 are spline fit with each other. Or instead, the spline shaft 125a formed on the input shaft 125 and the spline hole 201a formed on the intermediate shaft 201 of the transmission gear mechanism 17 are spline fit with each other. That is, the output member of the transmission gear mechanism 17 and the input member of the power split mechanism 4 are engaged by the spline.

Then, the case 130 is installed on the rear end of the housing 122. When the case 130 is installed on the housing 122, the output shaft 126 of the power split mechanism 4 is supported, and the assembly of the power transmitting apparatus TM is complete.

As described above, the power transmitting apparatus TM according to the present invention is provided with a transmission gear mechanism 17 between the engine 1, the first motor-generator 2 and the power split mechanism 4, the transmission gear mechanism 17 being provided with a planetary gear unit 17a (or 17b), the clutch C1 and the brake B1, that changes the rotation speed of the engine 1. Between the transmission gear mechanism 17 and the first motor-generator 2 is provided a support, that is, the MG1 cover 118 (or 217), that separates the transmission gear mechanism 17 from the first motor-generator 2, while supporting the rotor 2a of the first motor-generator 2. In the power transmitting apparatus TM according to the present invention, lubricant that has been supplied to the transmission gear mechanism 17 and that has lubricated and cooled the planetary gear unit 17a (or 17b), and the clutch C1 and the brake B1 of the transmission gear mechanism 17 can pass the MG1 cover 118 (or 217), and enter from the transmission gear mechanism 17 side into the first motor-generator 2 side. Specifically, at a location corresponding to an area near the outer periphery of the transmission gear mechanism 17 of the MG1 cover 118 (or 217), a lubrication hole 118b (or 217b) that allows communication of the lubricant is formed. Accordingly, lubricant that has been supplied to the transmission gear mechanism 17 and that has lubricated and cooled the planetary gear unit 17a (or 17b), and the clutch C1 and the brake B1 moves to the outer periphery side of the transmission gear mechanism 17 due to centrifugal force generated when the transmission gear mechanism 17 rotates, passes the lubrication hole 118b (or 217b) and flows into the first motor-generator 2 side from the transmission gear mechanism 17 side, to be supplied to the coil end 2b of the first motor-generator 2.

Therefore, according to the power transmitting apparatus TM of the present embodiment, even in the case of including the transmission gear mechanism 17 in the configuration thereof, the coil end 2b of the first motor-generator 2 can be cooled using lubricant that has lubricated and cooled the transmission gear mechanism 17 without newly adding complex oil passages and hydraulic devices in particular. That is, the lubrication performance and the cooling performance of the power transmitting apparatus TM can be improved without making devices complex or leading to increased costs.

Figure 14:
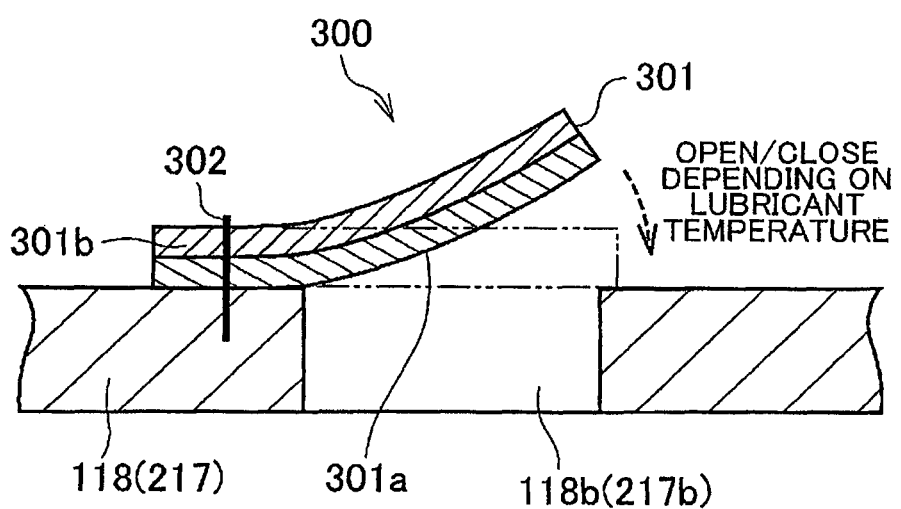
FIG. 14 is a sectional view for specifically illustrating a configuration of a power transmitting apparatus for a hybrid vehicle according to one embodiment of the present invention, showing a configuration of a regulating valve that is installed on a lubrication hole.

Further, in the power transmitting apparatus TM according to the present invention, a regulating valve 300 as shown in FIG. 14 can be provided on the aforementioned lubrication hole 118b in the MG1 cover 118 shown in FIG. 12 and the lubrication hole 217b in the MG1 cover 217 shown in FIG. 13. The regulating valve 300 in the example shown in FIG. 14 is operated in such manner that amount of lubricant that passes through the lubrication hole 118b or the lubrication hole 217b is changed in accordance with the lubricant temperature. A configuration of the regulating valve 300 employing bimetal is shown in FIG. 14. That is, in a configuration shown in FIG. 14, the regulating valve 300 is installed on either one of the openings of the lubrication hole 118b (or 217b) formed in the MG 1 cover 118 (or 217).

Specifically, the regulating valve 300 is provided with a flat plate valve body 301 having a valve seat area 301a large enough to cover the opening of the lubrication hole 118b (or 217b). Then, an end 301b of the valve body 301 is fixed to the MG1 cover 118 (or 217) by a bolt 302, for example. The valve body 301 is formed by a bimetal including a plurality of metal plates with different thermal expansion rates. The valve body 301 is, for example, fixed to the MG1 cover 118 (or 217) with the opening of the lubrication hole 118b (or 217b) open as shown in FIG. 14 under ordinary and low temperatures. Further, it is configured such that the valve body 301 deforms in a direction to close the opening of the lubrication hole 118b (or 217b) as the temperature rises. That is, it is configured such that the higher the lubricant temperature, the smaller the amount of lubricant passing through the lubrication hole 118b (or 217b). In other words, the regulating valve 300 is configured such that the lower the lubricant temperature, the more lubricant passing through the lubrication hole 118b (or 217b).

There used to be a possibility that sufficient lubricant cannot be supplied to the respective portions of the power transmitting apparatus TM while the lubricant temperature is still low under an extremely low temperature or immediately after the start of operation, such that lubricant for cooling the coil end 2b of the first motor-generator 2 becomes insufficient. According to the power transmitting apparatus TM of the example shown in FIG. 14, by installing the regulating valve 300 on the opening of the lubrication hole 118*b* (or 217*b*) as described above, more lubricant can be circulated from the lubrication hole 118*b* (or 217*b*) while the lubricant temperature is low to cool the coil end 2*b* of the first motor-generator 2. Also, after the temperature of the lubricant rises to a high temperature, the amount of lubricant passing through the lubrication hole 118*b* (or 217*b*) can be controlled. This prevents supplying unnecessary lubricant to the coil end 2*b*, and as a result, the lubricant is effectively used such that the respective portions of the power transmitting apparatus TM can be effectively lubricated and cooled.

Further, the abovementioned regulating valve 300 may be configured oppositely from that described above, in the case where the coil end 2*b* of the first motor-generator 2 needs to be further cooled when the lubricant temperature is high. Specifically, the regulating valve 300 may be configured such that the opening of the lubrication hole 118*b* (or 217*b*) is open when the lubricant temperature is high, and as the lubricant temperature becomes lower, and the valve body 301 deforms in a direction that closes the opening of the lubrication hole 118*b* (or 217*b*). That is, it may be configured such that the lower the lubricant temperature, the less lubricant passes through the lubrication hole 118*b* (or 217*b*). In other words, the configuration can be such that the higher the lubricant temperature, the more lubricant passes through the lubrication hole 118*b* (or 217*b*). Such configuration of the regulating valve 300 can be easily realized by arbitrarily setting materials and types of the bimetal forming the valve body 301.

Also, while in the abovementioned examples, a configuration of a so-called two-motor type hybrid vehicle that is provided with an engine 1 and the first motor-generator 2 and the second motor-generator 3 as drive force sources is cited as a hybrid vehicle addressed by the present invention, it may also be a hybrid vehicle having an engine and a plurality of, more than three, motor-generators, for example. Also, the vehicle may also be a so-called plug-in hybrid vehicle batteries of which can be directly charged from an external electric power source.

What is claimed is:

1. A power transmitting apparatus for a hybrid vehicle, the hybrid vehicle including an engine and at least one rotary machine as drive force sources, the power transmitting apparatus comprising:
    a power split mechanism including a differential device, the differential device including a first rotation element, a second rotation element and a third rotation element, the second rotation element being engaged with the rotary machine, and the third rotation element being engaged with a drive shaft, the power split mechanism configured to split and transmit dynamic power to the drive force source and the drive shaft;
    a transmission gear mechanism configured to change a rotation speed of the engine and transmit a torque to the first rotation element, the transmission gear mechanism configured to arrange in an order of the transmission gear mechanism, the rotary machine and the power split mechanism from a side closer to the engine; and
    a support arranged between the transmission gear mechanism and the rotary machine, the support configured to separate the transmission gear mechanism from the rotary machine and support a rotating shaft of the rotary machine, and the support having a lubrication hole, the lubrication hole being configured to allow lubricant that has lubricated and cooled the transmission gear mechanism to enter a rotary machine side from a transmission gear mechanism side of the support, wherein:
        the transmission gear mechanism includes a planetary gear unit and a friction device arranged on an outer periphery of the planetary gear unit,
        the lubrication hole is arranged in the support as a penetrating hole, and the lubricating hole is open to a position opposing both the outer periphery of the planetary gear unit and the rotary machine,
        the friction device includes a hub on which a portion of a friction material of the friction device is installed, and
        the hub extends in a direction of a rotational axis toward the support side, and a tip of the hub on the support side is opposed to an opening of the lubrication hole.

2. The power transmitting apparatus according to claim 1, wherein
    the support includes a rotary machine cover that covers the rotary machine side of the transmission gear mechanism, and
    the rotary machine cover has the lubrication hole.

3. The power transmitting apparatus according to claim 2, further comprising
    a regulating valve provided on the lubrication hole, the regulating valve configured to change an amount of the lubricant that passes through the lubrication hole depending on a temperature of the lubricant.

4. The power transmitting apparatus according to claim 2, wherein
    the transmission gear mechanism is a transmission gear unit accommodated inside a front cover that covers the transmission gear mechanism on a side of the engine, the transmission gear unit covered by the front cover and the rotary machine cover, and
    the transmission gear unit is attached to an end of a housing on a side of the transmission gear mechanism, the housing accommodating the rotary machine and the power split mechanism.

\* \* \* \* \*